United States Patent
Han et al.

(10) Patent No.: US 9,325,402 B2
(45) Date of Patent: Apr. 26, 2016

(54) METHOD AND APPARATUS FOR TRANSMITTING AND RECEIVING CODEBOOK SUBSET RESTRICTION BITMAP

(71) Applicant: Samsung Electronics Co., Ltd., Suwon-si, Gyeonggi-do (KR)

(72) Inventors: Jin Kyu Han, Seoul (KR); Bruno Clerckx, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 14/859,940

(22) Filed: Sep. 21, 2015

(65) Prior Publication Data

US 2016/0013853 A1    Jan. 14, 2016

Related U.S. Application Data

(63) Continuation of application No. 14/557,800, filed on Dec. 2, 2014, now Pat. No. 9,178,596, which is a continuation of application No. 13/249,660, filed on Sep. 30, 2011, now Pat. No. 8,913,674.

(60) Provisional application No. 61/411,105, filed on Nov. 8, 2010, provisional application No. 61/389,472, filed on Oct. 4, 2010.

(51) Int. Cl.
   *H04B 7/06*        (2006.01)
   *H04L 25/03*       (2006.01)
   (Continued)

(52) U.S. Cl.
   CPC .............. *H04B 7/0639* (2013.01); *H04B 1/04* (2013.01); *H04B 1/16* (2013.01); *H04B 1/40* (2013.01);
   (Continued)

(58) Field of Classification Search
   CPC .. H04B 7/0639; H04B 7/0486; H04B 7/0473; H04B 7/0691; H04B 7/0482; H04B 7/0632; H04B 7/0478; H04L 25/03929; H04L 25/03942; H04L 25/03917; H04L 25/03923
   See application file for complete search history.

(56) References Cited

U.S. PATENT DOCUMENTS

| | | |
|---|---|---|
| 8,913,674 B2 | 12/2014 | Han et al. |
| 2010/0195615 A1 | 8/2010 | Lee et al. |
| 2011/0255635 A1 | 10/2011 | Lee et al. |

FOREIGN PATENT DOCUMENTS

| | | |
|---|---|---|
| CN | 101541063 A | 9/2009 |
| CN | 101834707 A | 9/2010 |

(Continued)

OTHER PUBLICATIONS

Way Forward on 8Tx Codebook for REL.10 DL MIMO, 3GPP TSG RAN WG1 62, Aug. 27, 2010. Madrid, Spain.

(Continued)

*Primary Examiner* — Daniel Washburn
*Assistant Examiner* — Eboni Hughes
(74) *Attorney, Agent, or Firm* — Jefferson IP Law, LLP

(57) ABSTRACT

A method for transmitting and receiving a codebook subset restriction bitmap is provided. The Codebook Subset Restriction (CSR) bitmap transmission method of an evolved Node B (eNB) in transmission mode 9 for communication with 8 antenna ports includes generating a CSR bitmap including bits corresponding to restricted precoding matrix indicators and rank indicators that are not allowed for reporting and transmitting the CSR bitmap to a User Equipment (UE). The CSR bitmap comprises 53 bits corresponding to a first codebook and 56 bits corresponding to a second codebook, the 53 bits corresponding to a first codebook comprise 16, 16, 4, 4, 4, 4, and 1 bits for layers 1, 2, 3, 4, 5, 6, 7, and 8, respectively, and the 56 bits corresponding to a second codebook comprise 16, 16, 16 and 8 bits for layers 1, 2, 3, and 4, respectively.

16 Claims, 7 Drawing Sheets

(51) Int. Cl.
    *H04W 72/04*     (2009.01)
    *H04W 74/00*     (2009.01)
    *H04B 1/04*     (2006.01)
    *H04B 1/16*     (2006.01)
    *H04B 1/40*     (2015.01)
    *H04B 7/04*     (2006.01)
    *H04W 88/02*     (2009.01)
    *H04W 88/08*     (2009.01)

(52) U.S. Cl.
    CPC ............ *H04B 7/0413* (2013.01); *H04B 7/0456* (2013.01); *H04B 7/0658* (2013.01); *H04L 25/03929* (2013.01); *H04L 25/03942* (2013.01); *H04W 72/04* (2013.01); *H04W 74/002* (2013.01); *H04B 7/0478* (2013.01); *H04B 7/0482* (2013.01); *H04B 7/0486* (2013.01); *H04B 7/0632* (2013.01); *H04B 7/0691* (2013.01); *H04L 25/03917* (2013.01); *H04L 25/03923* (2013.01); *H04W 88/02* (2013.01); *H04W 88/08* (2013.01)

(56) References Cited

FOREIGN PATENT DOCUMENTS

| WO | 2010/071369 A2 | 6/2010 |
| WO | 2010/090442 A2 | 8/2010 |

OTHER PUBLICATIONS

Introduction of REL-10 LTE-Advanced Features in 36.213, 3GPP TSG-RAN Meeting #62, Sep. 14, 2010. Madrid, Spain.

METHOD AND APPARATUS FOR TRANSMITTING AND RECEIVING CODEBOOK SUBSET RESTRICTION BITMAP

CROSS-REFERENCE TO RELATED APPLICATION(S)

This application is a continuation application of prior application Ser. No. 14/557,800, filed on Dec. 2, 2014, which is a continuation application of a prior application Ser. No. 13/249,660, filed on Sep. 30, 2011, which has issued as U.S. Pat. No. 8,913,674 on Dec. 16, 2014 and claimed the benefit under 35 U.S.C 119 (e) of a U.S. Provisional application filed on Nov. 8, 2010 in the U.S. Patent and Trademark Office and assigned Ser. No. 61/411,105 and of a U.S. Provisional application filed on Oct. 4, 2010 in the U.S. Patent and Trademark Office and assigned Ser. No. 61/389,472, the entire disclosures of each of which are hereby incorporated by reference.

BACKGROUND OF THE INVENTION

1. Field of the Invention

The present invention relates to a transmission/reception method for supporting Multiple Input Multiple Output (MIMO) based on feedback in a Downlink (DL) of the 3rd Generation Partnership Project (3GPP) Long Term Evolution (LTE). More particularly, the present invention relates to a method for restricting feedback of Precoding Matrix Indication (PMI) in 8-transmit antenna MIMO supported in LTE Release (Rel)-10.

2. Description of the Related Art

Mobile communication systems have evolved into high-speed, high-quality wireless packet data communication systems providing data services and multimedia services in addition to voice-oriented services. Recently, various mobile communication standards, such as High Speed Downlink Packet Access (HSDPA) and High Speed Uplink Packet Access (HSUPA), both defined by a 3rd Generation Partnership Project (3GPP), High Rate Packet Data (HRPD) defined by a 3rd Generation Partnership Project-2 (3GPP2), and 802.16 defined by the Institute for Electrical and Electronics Engineers (IEEE), have been developed to support the high-speed, high-quality wireless packet data communication services.

Recent mobile communication systems use technologies such as Adaptive Modulation and Coding (AMC) and Channel-Sensitive Scheduling to improve transmission efficiency. With the AMC method, a transmitter can adjust the amount of transmission data according to the channel state. When the channel state is bad, the transmitter reduces the amount of transmission data to adjust the reception error probability to a desired level, and when the channel state is good, the transmitter increases the amount of transmission data to adjust the reception error probability to the desired level, thereby efficiently transmitting a large volume of information. With the Channel-Sensitive Scheduling-based resource management method, the transmitter selectively services the user having a better channel state among several users, thus increasing the system capacity compared to allocating a channel to one user and servicing the user with the allocated channel. Such capacity increase is called 'multi-user diversity gain'. The AMC method and the Channel-Sensitive Scheduling method apply an appropriate modulation and coding scheme at the most-efficient time determined depending on the partial channel state information fed back from a receiver.

Recently, intensive research is being conducted to replace Code Division Multiple Access (CDMA), the multiple access scheme used in the 2nd and 3rd generation mobile communication systems, with Orthogonal Frequency Division Multiple Access (OFDMA) in the next generation system. Standardization organizations such as 3GPP, 3GPP2, and IEEE have begun work on the evolved systems employing OFDMA. The OFDMA scheme, compared to the CDMA scheme, is expected to have an increase in capacity. One of several causes bringing about the capacity increase in the OFDMA scheme is that the OFDMA scheme can perform scheduling in the frequency domain (i.e., Frequency Domain Scheduling). As the transceiver acquires capacity gain according to the time-varying channel characteristic using the Channel-Sensitive Scheduling method, the transceiver can obtain the higher capacity gain with use of the frequency-varying channel characteristic.

In LTE, Orthogonal Frequency Division Multiplexing (OFDM) has been adopted for Downlink (DL) transmission and Single Carrier Frequency Division Multiple Access (SC-FDMA) for Uplink (UL) transmission, and both the transmission schemes are characterized by scheduling on the frequency axis.

The AMC and channel sensitive scheduling are capable of improving transmission efficiency when the transmitter has enough information on the transmit channel. In LTE DL, the base station cannot estimate a DL channel state using the UL receive channel in a Frequency Division Duplex (FDD) mode such that a User Equipment (UE) reports the information on the DL channel. However, reporting of the DL channel report of the UE to the base station can be omitted in a Time Division Duplex (TDD) mode in which the DL transmit channel state is estimated through the UL receive channel. In LTE UL, the UE transmits a Sounding Reference Signal (SRS) such that the base station estimates an UL channel using the received SRS.

In Downlink of LTE, a multiple antenna transmission technique, i.e. Multiple Input Multiple Output (MIMO), is supported. The evolved Node B (eNB) of the LTE system can be implemented with one, two, or four transmit antennas and thus can achieve beamforming gain and spatial multiplex gain by adopting precoding with the multiple transmit antennas. Since LTE Release (Rel)-10 is an advanced LTE standard, the evolved Node B (eNB) supports transmission with 8 transmit antennas.

FIG. 1 is a block diagram illustrating a configuration of an LTE eNB supporting DL MIMO according to the related art. The configuration of FIG. 1 is adopted for the operations of LTE Rel-10 system supporting transmission with 8 transmit antennas as well as the LTE system of the related art.

Referring to FIG. 1, in DL MIMO, the eNB can transmit up to two codewords 101. The codewords are transmitted in different transmission formats. The codewords are scrambled by the corresponding scramblers 103a and 103b and then modulated by the corresponding modulation mapper 105a and 105b. The modulation signals are converted to one or more signal streams 109 to be transmitted on the same frequency-time resource by the layer mapper 107. The signal streams are transmitted on the corresponding layers generated by the precoder 111. The precoded signal streams are mapped to the Resource Elements (REs) of frequency-time resource by the RE mappers 113a and 113b and then modulated to OFDM symbols by the OFDM symbol generators 115a and 115b so as to be transmitted through the transmit antenna ports 117. The controller 123 controls to determine the transmission scheme and resource such as the modulation scheme, number of layers, precoding scheme, and RE allocation, based on the feedback information received by means of the feedback receiver 119. The feedback information includes the DL channel state reported by the UE.

FIG. 2 is a block diagram illustrating a configuration of an LTE UE supporting DL MIMO according to the related art. The configuration of FIG. 2 is adopted for the operations of LTE Rel-10 system supporting transmission with 8 transmit antennas as well as the LTE system of the related art.

Referring to FIG. 2, the UE converts the Radio Frequency (RF) signal received through the receive antennas 201 in baseband signals by means of the RF receivers 203a and 203b. The Reference Signal (RS) carrying the DL channel information is extracted from the converted baseband signal. The channel estimator 205 uses the RS to estimate the DL channel. Physical Downlink Control Channel (PDCCH) and Physical Downlink Shared Channel (PDSCH) are recovered by the PDCCH/PDSCH receiver 207. The signaling information transmitted by the eNB through PDCCH and PDSCH is delivered to the controller 211 such that the controller 211 saves the eNB instruction in the memory 213. The channel estimation value obtained by the channel estimator 205 is used for demodulating PDSCH/PDCCH and generating feedback information by the feedback information generator 209. The feedback information generator 209 generates the feedback information, such as Channel Quality Indication (CQI), Precoding Matrix Indication (PMI), and Rank Indication (RI), and transmits the feedback information on Physical Uplink Control Channel (PUSCH). Since the Single Carrier Frequency Domain Multiple Access (SC-FDMA) is adopted in LTE UL, the feedback information is carried in the PUSCH. Table 1 shows the DL transmission modes defined in LTE Rel-8 and Rel-9.

TABLE 1

DL Transmission (TX) modes supported in LTE Rel-8 and Rel-9

| Transmission mode | Description |
|---|---|
| 1 | Single-antenna port, port 0 |
| 2 | Transmit diversity |
| 3 | Open-loop spatial multiplexing |
| 4 | Closed-loop spatial multiplexing |
| 5 | Multi-user MIMO |
| 6 | Closed-loop spatial multiplexing using a single transmission layer |
| 7 | Single-antenna port; port 5 |
| 8 | Dual layer transmission; port 7 or 8 or both |

In the LTE system, the transmission port is defined by the RS used in modulation. In LTE DL, the RS associated with the transmission port p is transmitted through the antenna port p. The set of transmit/antenna port p is composed differently according to the RS configuration of the corresponding eNB.

Cell-specific RS (CRS) is defined for the eNB using 1, 2, or 4 transmit antennas corresponding to the antenna ports of p=0, p={0,1}, and p={0, 1, 2, 3}.

Multicast Broadcast Single Frequency Network (MBSFN) RS corresponds to the antenna port of p=4.

DeModulation RS (DM-RS) as UE-specific RS corresponds to the antenna port of p=5 in transmission mode 7 and p=7, p=8, or p={7, 8} in transmission mode 8.

The transmission modes 1 to 6 support the CRS-based transmission schemes. For example, the transmission modes 3 and 4 support spatial multiplexing with the CRS as the reference signal for demodulation. The transmission modes 7 and 8 use the DM-RS for demodulation. In order to support the closed-loop MIMO, the UE estimates the DL MIMO channel with CRS and reports CQI, PMI, and RI to the eNB. The CQI is referenced by the eNB to determine Modulation and Coding Scheme (MCS), and the PMI and RI are referenced by the eNB to determine the precoding and number of MIMO transmission layers. The eNB makes a final determination on the transmission scheme, precoding scheme, and transmission resource for transmission of a PDSCH as a DL data channel based on the feedback information such as CQI, PMI, and RI.

In order to perform the closed-loop operation normally, the UE and eNB should interpret the feedback information identically. The LTE system uses a standardized codebook for precoding to define the feedback information of PMI and RI. Table 2 shows the codebook used in the LTE system with two transmit antennas.

TABLE 2 precoding codebook for LTE system with two TX antennas

| Codebook index | Number of layers | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

A precoding matrix is selected from Table 2. However, the matrix $$W = \frac{1}{\sqrt{2}}\begin{bmatrix}1 & 0\\0 & 1\end{bmatrix}$$

is the precoding matrix only for the open-loop spatial multiplexing.

Table 3 shows the codebook used in the LTE system with four transmit antennas. $W_n^{\{s\}}$ is the matrix defined by the column vectors given by the set $\{s\}$ as shown in the following equation:

$$W_n = I - 2\frac{u_n u_n^H}{u_n^H u_n}$$

where I denotes a 4×4 unitary matrix, and $u_n$ denotes the value given in Table 3.

TABLE 3 precoding codebook for LTE system with four TX antennas

| Codebook index $u_n$ | Number of layers $v$ | | | |
|---|---|---|---|---|
| | 1 | 2 | 3 | 4 |
| 0  $u_0 = [1\ -1\ -1\ -1]^T$ | $w_0^{\{1\}}$ | $w_0^{\{14\}}/\sqrt{2}$ | $w_0^{\{124\}}/\sqrt{2}$ | $w_0^{\{1234\}}/\sqrt{2}$ |
| 1  $u_1 = [1\ -j\ 1\ j]^T$ | $w_1^{\{1\}}$ | $w_1^{\{12\}}/\sqrt{2}$ | $w_1^{\{123\}}/\sqrt{2}$ | $w_1^{\{1234\}}/\sqrt{2}$ |
| 2  $u_2 = [1\ 1\ -1\ 1]^T$ | $w_2^{\{1\}}$ | $w_2^{\{12\}}/\sqrt{2}$ | $w_2^{\{123\}}/\sqrt{2}$ | $w_2^{\{3214\}}/\sqrt{2}$ |
| 3  $u_3 = [1\ j\ 1\ -j]^T$ | $w_3^{\{1\}}$ | $w_3^{\{12\}}/\sqrt{2}$ | $w_3^{\{123\}}/\sqrt{2}$ | $w_3^{\{3214\}}/\sqrt{2}$ |
| 4  $u_4 = [1\ (-1-j)/\sqrt{2}\ -j\ (1-j)/\sqrt{2}\ ]^T$ | $w_4^{\{1\}}$ | $w_4^{\{14\}}/\sqrt{2}$ | $w_4^{\{124\}}/\sqrt{2}$ | $w_4^{\{1234\}}/\sqrt{2}$ |
| 5  $u_5 = [1\ (-1-j)/\sqrt{2}\ j\ (-1-j)/\sqrt{2}\ ]^T$ | $w_5^{\{1\}}$ | $w_5^{\{14\}}/\sqrt{2}$ | $w_5^{\{124\}}/\sqrt{2}$ | $w_5^{\{1234\}}/\sqrt{2}$ |
| 6  $u_6 = [1\ (1+j)/\sqrt{2}\ -j\ (-1+j)/\sqrt{2}\ ]^T$ | $w_6^{\{1\}}$ | $w_6^{\{13\}}/\sqrt{2}$ | $w_6^{\{134\}}/\sqrt{2}$ | $w_6^{\{1324\}}/\sqrt{2}$ |
| 7  $u_7 = [1\ (-1+j)/\sqrt{2}\ j\ (1+j)/\sqrt{2}\ ]^T$ | $w_7^{\{1\}}$ | $w_7^{\{13\}}/\sqrt{2}$ | $w_7^{\{134\}}/\sqrt{2}$ | $w_7^{\{1324\}}/\sqrt{2}$ |
| 8  $u_8 = [1\ -1\ 1\ 1]^T$ | $w_8^{\{1\}}$ | $w_8^{\{12\}}/\sqrt{2}$ | $w_8^{\{124\}}/\sqrt{2}$ | $w_8^{\{1234\}}/\sqrt{2}$ |
| 9  $u_9 = [1\ -j\ -1\ -j]^T$ | $w_9^{\{1\}}$ | $w_9^{\{14\}}/\sqrt{2}$ | $w_9^{\{134\}}/\sqrt{2}$ | $w_9^{\{1234\}}/\sqrt{2}$ |
| 10  $u_{10} = [1\ 1\ 1\ -1]^T$ | $w_{10}^{\{1\}}$ | $w_{10}^{\{13\}}/\sqrt{2}$ | $w_{10}^{\{123\}}/\sqrt{2}$ | $w_{10}^{\{1324\}}/\sqrt{2}$ |
| 11  $u_{11} = [1\ j\ -1\ j]^T$ | $w_{11}^{\{1\}}$ | $w_{11}^{\{13\}}/\sqrt{2}$ | $w_{11}^{\{134\}}/\sqrt{2}$ | $w_{11}^{\{1324\}}/\sqrt{2}$ |
| 12  $u_{12} = [1\ -1\ -1\ 1]^T$ | $w_{12}^{\{1\}}$ | $w_{12}^{\{12\}}/\sqrt{2}$ | $w_{12}^{\{123\}}/\sqrt{2}$ | $w_{12}^{\{1234\}}/\sqrt{2}$ |
| 13  $u_{13} = [1\ -1\ 1\ -1]^T$ | $w_{13}^{\{1\}}$ | $w_{13}^{\{13\}}/\sqrt{2}$ | $w_{13}^{\{123\}}/\sqrt{2}$ | $w_{13}^{\{1324\}}/\sqrt{2}$ |
| 14  $u_{14} = [1\ 1\ -1\ -1]^T$ | $w_{14}^{\{1\}}$ | $w_{14}^{\{13\}}/\sqrt{2}$ | $w_{14}^{\{123\}}/\sqrt{2}$ | $w_{14}^{\{3214\}}/\sqrt{2}$ |
| 15  $u_{15} = [1\ 1\ 1\ 1]^T$ | $w_{15}^{\{1\}}$ | $w_{15}^{\{12\}}/\sqrt{2}$ | $w_{15}^{\{123\}}/\sqrt{2}$ | $w_{15}^{\{1234\}}/\sqrt{2}$ |

Precoding used in DL MIMO channel is a significant technology for obtaining beamforming gain and spatial multiplexing gain. The UE reports the channel state of the given DL MIMO channel to the eNB with the most appropriate PMI and RI. PMI is the value indicating the precoding matrix requested by the UE, and RI is the value indicating the maximum number of layers for transmitting signals simultaneously in the current channel state that is determined by the UE.

However, the eNB cannot accept a precoding matrix and rank selected by the UE. For example, the eNB should avoid a precoding matrix and rank that causes significant interference to the neighbor cells. The eNB also may not support some precoding matrices due to the high transmitter complexity or may restrict the PMI and RI selectable by the UE due to the lack of the reliability on the feedback information from the UE.

In order for the eNB to restrict PMI and RI fed back from the UE, a Codebook Subset Restriction (CSR) technique is introduced in LTE Rel-8 and Rel-9. A CRS bitmap is sent to each UE by upper layer signaling. A specific bit of the bitmap matches the corresponding precoding matrix. A specific bit is set to 0 in the CRS bitmap, and the precoding matrix corresponding to the bit is restricted such that the UE feedback on the restricted matrix is blocked. The size of the CRS bitmap is identical with the total number of precoding matrices defined in the standard and determined depending on the transmission mode of the UE and number of CRS antenna ports of the eNB.

FIG. 3 is a signaling diagram illustrating a closed-loop precoding procedure with CSR according to the related art.

Referring to FIG. 3, the eNB 301 first performs codebook subset restriction signaling to the UE 303 in step 305. The UE stores the CSR bitmap and, when feedback is necessary, determines CQI, PMI, and RI by referencing the CSR bitmap in step 309. The feedback information generated in step 309 is transmitted to the eNB in step 311. The eNB perform DL scheduling in step 313 based on the feedback information, and transmits PDCCH and PDSCH in step 315. The UE receives PDCCH to acquire the information on PDSCH in step 317 and receives the PDSCH in step 319. The process 307 including steps 309 to 319 shows the operations of the eNB and UE for normal closed-loop DL transmission. The CSR signaling update 305 is not necessary for every feedback and data reception process 307. The CSR signaling can be performed by the eNB when CSR update is necessary.

In LTE Rel-8 and Rel-9, the CSR is supported in transmission modes 3, 4, 5, 6, and 8. The CSR bitmap sizes in the individual transmission modes are summarized in Table 4.

TABLE 4

CSR bitmap size per transmission mode

| | Number of bits $A_C$ | |
|---|---|---|
| Transmission mode | 2 antenna ports | 4 antenna ports |
| 3 | 2 | 4 |
| 4 | 6 | 64 |
| 5 | 4 | 16 |
| 6 | 4 | 16 |
| 8 | 6 | 32 |

The CSR bitmap is expressed with a bit stream of $\{a_{A_C-1}, \ldots, a_3, a_2, a_2, a_1, a_0\}$. Here, $a_0$ is the Least Significant Bit (LSB), and $a_{A_C-1}$ is the Most Significant Bit (MSB).

Transmission Mode 4 is the transmission mode for the closed-loop MIMO based on the DL CRS defined in LTE Rel-8. In transmission mode 4, the total number of precoding matrices defined in 2-TX codebook is 6 such that the bitmap size of 6 is used for transmission mode 4 CSR signaling of the LTE system supporting two transmit antennas. The total number of precoding matrices defined in 4-TX codebook is 64 such that the bitmap size of 64 is used for transmission mode 4 CSR signaling of the LTE system supporting four transmit antennas.

Transmission Mode 8 is the transmission mode for dual beamforming based on the DL DM-RS added in LTE Rel-9. In transmission mode 8, only rank-1 or rank-2 transmission is supported. In transmission mode 8, the total number of precoding matrices defined in 4-TX codebook is 32 such that the bitmap size of 32 is used for the transmission mode 8 CRS signaling of the LTE system supporting four transmit antennas.

Each bit of the CRS signaling bitmap per transmission mode is interpreted as follows:

Transmission Mode 3

2 TX antennas: Bit $a_{v-1}$, v=2 is designated for the precoding matrix corresponding to the codebook index i of Table 2 and rank 2. Here, $a_0$ denotes the precoding for transmission diversity.

4 TX antennas: Bit $a_{v-1}$, v=2, 3, 4 is designated for the precoding matrix corresponding to the codebook indices 12, 13, 14, and 15 in Table 3 and rank v. Here, $a_0$ denotes the precoding for transmission diversity.

Transmission Mode 4

2 TX antennas: Refer to Table 5

4 TX antennas: Bit $a_{16(v-1)+i}$ is designated for the precoding matrix corresponding to the codebook index i in Table 3 and rank v.

Transmission Modes 5 and 6

2 TX antennas: Bit $a_i$ is designated for the precoding matrix corresponding to the codebook index i in Table 2 and rank 1.

4 TX antennas: Bit $a_i$ is designated for the precoding matrix corresponding to the codebook index i in Table 3 and rank 1.

Transmission Mode 8

2 TX antennas: Refer to Table 5

4 TX antennas: Bit $a_{16(v-1)+i}$ is designated for the precoding matrix corresponding to the codebook index in Table 3 and rank v, where v=1,2.

Table 5 shows the summarized rule for interpreting the CSR bit map in transmission modes 4 and 8 with two transmit antennas.

TABLE 5 relationship between CSR bitmap and precoding matrix in 2-TX codebook

| Code book index | Number of layers | |
| --- | --- | --- |
| | 1 | 2 |
| 0 | $a_0$ | — |
| 1 | $a_1$ | $a_4$ |
| 2 | $a_2$ | $a_5$ |
| 3 | $a_3$ | — |

In the technique of the related art, the CSR bitmap is defined to match the bits to the precoding matrices available in a specific transmission mode one by one. In LTE Rel-8 and Rel-9, the conventional method can support the use of CRS since only one precoding codebook is defined per transmission mode.

In LTE Rel-10 which first supports 8 transmit antennas, however, the 8-TX codebook is newly defined. With the increase of the number of transmit antennas, the width of the beam formed by precoding becomes narrow, resulting in increase of array antenna gain. Improved array antenna gain can actually be obtained only when the eNB can receive the more accurate PMI feedback information. In LTE Rel-10, a dual codebook structure is adopted for new 8-TX codebook structure for defining the PMI feedback information without large increase of feedback overhead.

With the introduction of the newly structured precoding codebook, the conventional CSR bitmap signaling method cannot be reused any more. There is therefore a need of the efficient CSR signaling method to address this issue.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a Codebook Subset Restriction (CSR) signaling method suitable for the 8-Transmission (TX) dual codebook structure in the Long Term Evolution (LTE) DownLink (DL) system with 8 transmit antennas. Also, another aspect of the present invention is to provide a method for reducing the size of the CRS bitmap efficiently in consideration of the CRS signaling overhead.

In accordance with an aspect of the present invention, a CSR bitmap transmission method of an evolved Node B (eNB) in transmission mode 9 for communication with 8 antenna ports is provided. The method includes generating a CSR bitmap including bits corresponding to restricted precoding matrix indicators and rank indicators that are not allowed for reporting, and transmitting the CSR bitmap to a User Equipment (UE). The CSR bitmap comprises 53 bits corresponding to a first codebook and 56 bits corresponding to a second codebook, the 53 bits corresponding to a first codebook comprise 16, 16, 4, 4, 4, 4 and 1 bits for layers 1, 2, 3, 4, 5, 6, 7, and 8, respectively, and the 56 bits corresponding to a second codebook comprise 16, 16, 16 and 8 bits for layers 1, 2, 3 and 4, respectively.

In accordance with another aspect of the present invention, an eNB for transmitting a CSR bitmap in transmission mode 9 for communication with 8 antenna ports is provided. The eNB includes a controller for generating a CSR bitmap including bits corresponding to restricted precoding matrix indicators and rank indicators that are not allowed for reporting; and a communication unit for transmitting the CSR bitmap to a UE. The CSR bitmap comprises 53 bits corresponding to a first codebook and 56 bits corresponding to a second codebook, the 53 bits corresponding to a first codebook comprise 16, 16, 4, 4, 4, 4 and 1 bits for layers 1, 2, 3, 4, 5, 6, 7, and 8, respectively, and the 56 bits corresponding to a second codebook comprise 16, 16, 16 and 8 bits for layers 1, 2, 3, and 4, respectively. The bit $a_{f^{(1)}(v)+i_1}$ of the CSR bitmap corresponds to a codebook index $i_1$ a layer v, and the bit $a_{53+f^{(2)}(v)+i_2}$ corresponds to a codebook index $i_2$ and a layer v. $f^{(1)}(v)$ and $f^{(2)}(v)$ are defined as following equations, respectively:

$$f^{(1)}(v) = \begin{cases} 0 & \text{for } v = 1 \\ 16 & \text{for } v = 2 \\ 32 & \text{for } v = 3 \\ 36 & \text{for } v = 4 \\ 40 & \text{for } v = 5 \\ 44 & \text{for } v = 6 \\ 48 & \text{for } v = 7 \\ 52 & \text{for } v = 8 \end{cases} \text{ and } f^{(2)}(v) = \begin{cases} 0 & \text{for } v = 1 \\ 16 & \text{for } v = 2 \\ 32 & \text{for } v = 3 \\ 48 & \text{for } v = 4 \end{cases}$$

In accordance with another aspect of the present invention, a CSR bitmap reception method of a UE in transmission mode 9 for communication with 8 antenna ports is provided. The method includes receiving a CSR bitmap transmitted by an eNB, and extracting, based on the CSR bitmap, restricted precoding matrix indicators and rank indicators that are not allowed for reporting. The CSR bitmap comprises 53 bits corresponding to a first codebook and 56 bits corresponding to a second codebook, the 53 bits corresponding to a first codebook comprise 16, 16, 4, 4, 4, 4 and 1 bits for layers 1, 2, 3, 4, 5, 6, 7, and 8, respectively, and the 56 bits corresponding to a second codebook comprise 16, 16, 16, and 8 bits for layers 1, 2, 3, and 4, respectively.

In accordance with another aspect of the present invention, a UE for receiving a CSR bitmap in transmission mode 9 for communication with 8 antenna ports is provided. The UE includes a communication unit for receiving a CSR bitmap transmitted by an evolved Node B (eNB), and a controller for extracting, based on the CSR bitmap, restricted precoding matrix indicators and rank indicators that are not allowed for reporting. The CSR bitmap comprises 53 bits corresponding to a first codebook and 56 bits corresponding to a second codebook, the 53 bits corresponding to a first codebook comprise 16, 16, 4, 4, 4, 4 and 1 bits for layers 1, 2, 3, 4, 5, 6, 7, and 8, respectively, and the 56 bits corresponding to a second codebook comprise 16, 16, 16 and 8 bits for layers 1, 2, 3 and 4, respectively. The bit $a_{f^{(1)}(v)+i_1}$ of the CSR bitmap corresponds to a codebook index $i_1$ and a layer v, and the bit $a_{53+f^{(2)}(v)+i_2}$ corresponds to a codebook index $i_2$ and a layer v. $f^{(1)}(v)$ and $f^{(2)}(v)$ are defined as following equations, respectively:

$$f^{(1)}(v) = \begin{cases} 0 & \text{for } v = 1 \\ 16 & \text{for } v = 2 \\ 32 & \text{for } v = 3 \\ 36 & \text{for } v = 4 \\ 40 & \text{for } v = 5 \\ 44 & \text{for } v = 6 \\ 48 & \text{for } v = 7 \\ 52 & \text{for } v = 8 \end{cases} \text{ and } f^{(2)}(v) = \begin{cases} 0 & \text{for } v = 1 \\ 16 & \text{for } v = 2 \\ 32 & \text{for } v = 3 \\ 48 & \text{for } v = 4 \end{cases}.$$

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
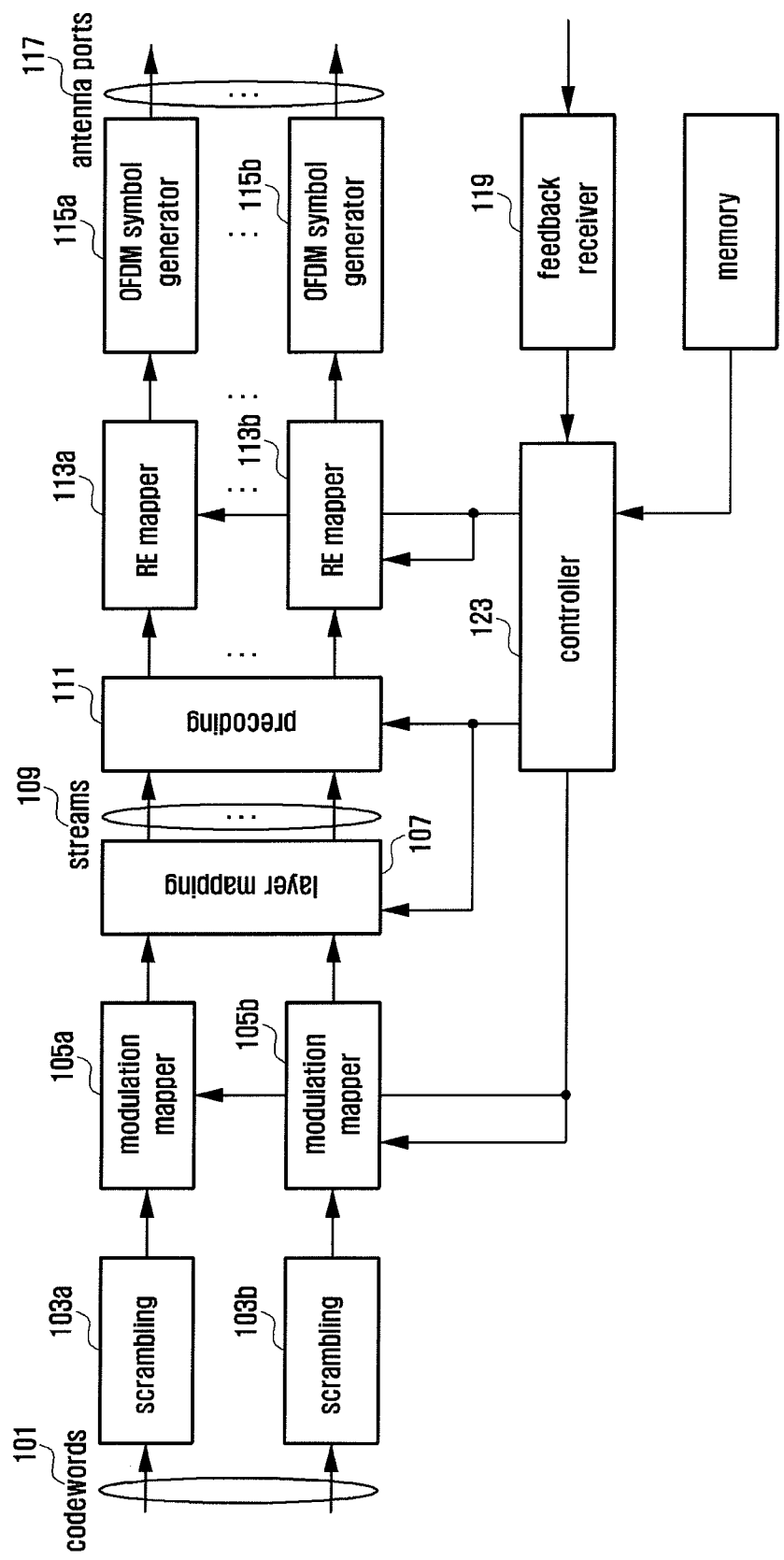
FIG. 1 is a block diagram illustrating a configuration of a Long Term Evolution (LTE) evolved Node B (eNB) supporting DownLink (DL) Multiple Input Multiple Output (MIMO) according to the related art.
Figure 2:
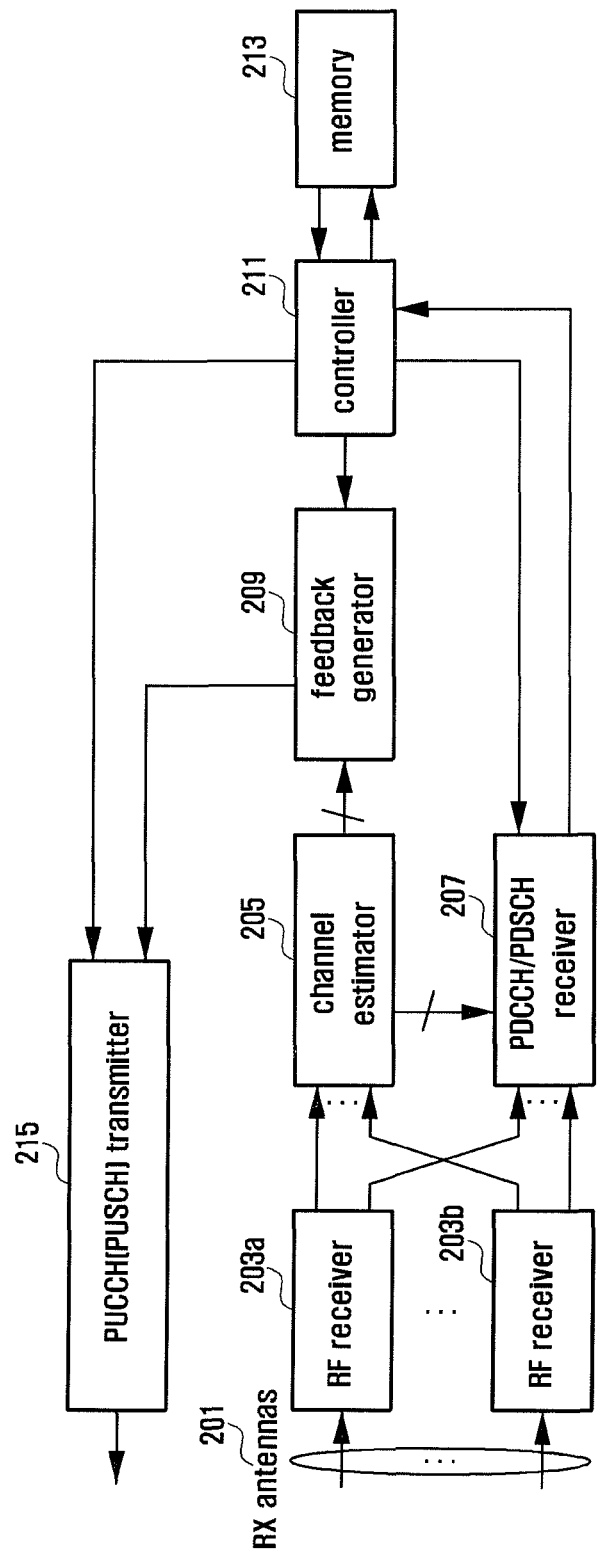
FIG. 2 is a block diagram illustrating a configuration of an LTE UE supporting DL MIMO according to the related art.
Figure 3:
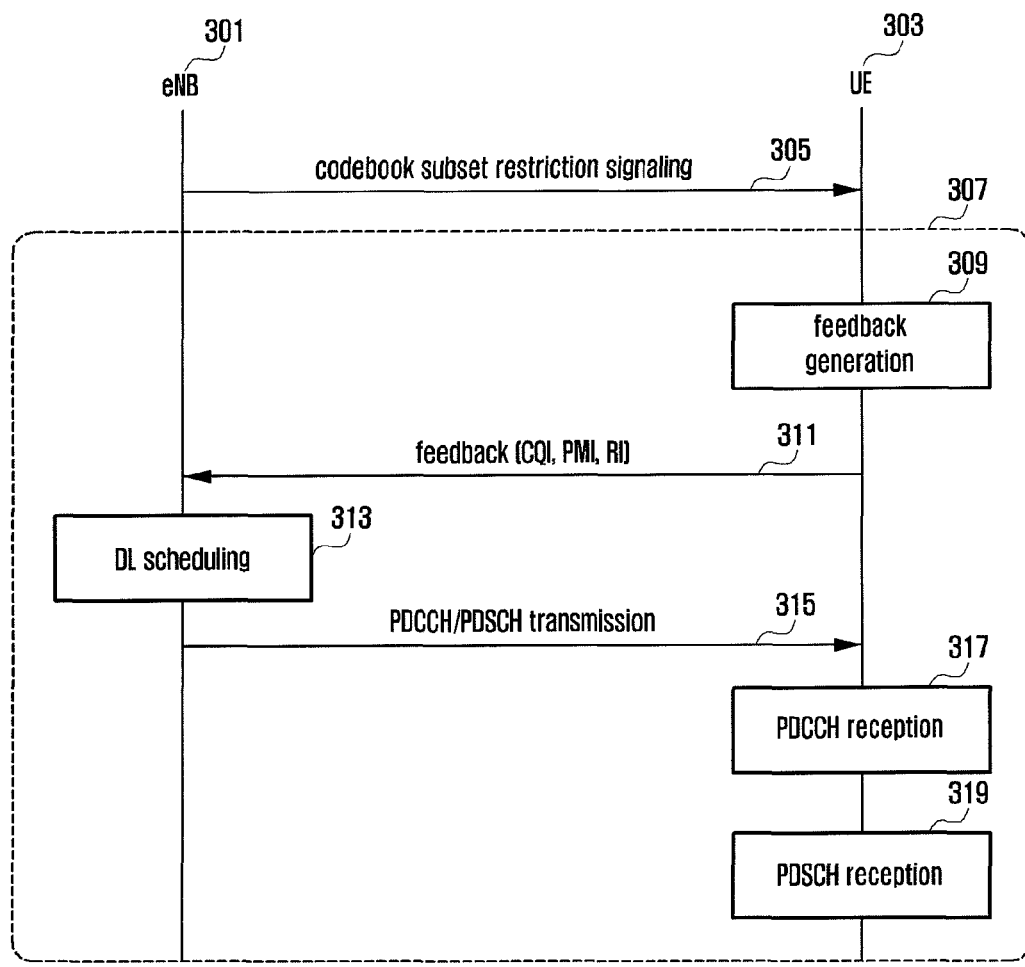
FIG. 3 is a signaling diagram illustrating a closed-loop precoding procedure with Codebook Subset Restriction (CSR) according to the related art.

Exemplary embodiments of the present invention provide a method for supporting Codebook Subset Restriction (CSR) efficiently in the Long Term Evolution (LTE)-advanced system supporting up to 8 transmit antennas. The exemplary embodiments are described with reference to the configurations of an evolved Node B (eNB) and User Equipment (UE) of FIGS. 1 and 2. According to exemplary embodiments of the present invention, however, internal operations of various components may be modified, including the layer mapper 107, precoder 111, feedback receiver 119, memory 121, and controller 123 of FIG. 1, and the feedback information generator 209, controller 211, memory 213, and Physical Uplink Control Channel (PUCCH)/Physical Uplink Shared Channel (PUSCH) transmitter 215 of FIG. 2.

In the 3rd Generation Partnership Project (3GPP), discussion has been conducted on DownLink (DL) Multiple Input Multiple Output (MIMO) for LTE-advanced. In order to support 8-layers transmission in LTE Release (Rel)-10, Channel State Information Reference Signal (CSI-RS) is introduced along with a definition of a new 8-Transmission (Tx) codebook. CSI-RS supports 2, 4, and 8 transmit antenna ports. The eNB supporting 2 transmit antenna ports uses the antenna port numbers of p=15,16, the eNB supporting 4 transmit antennas uses the antenna port numbers of p=15, . . . , 18. The eNB supporting 8 transmit antennas uses the antenna port numbers of p=15, . . . , 22. In order for the UE to demodulate the advanced DL multiple antenna transmission signals, the LTE Rel-10 eNB performs precoding on DeModulation Reference Signal (DM-RS) along with data signals using the same precoding scheme, and thus no additional control signal is required to explicitly indicate the precoding scheme applied by the eNB. In case of using the Cell-Specific Reference Signal (CSI) for demodulation, the user-specific precoding is applied to the data signal but not RS such that the eNB selects the precoding codeword from the predetermined codebook to apply to the data signal and transmits a separate signal for indicating the precoding codeword explicitly. In case of using DM-RS, a requirement of using only precoding codewords for the data signal that are defined in the codebook is negated. Even when the DM-RS is used in DL MIMO transmission, the eNB should transmit Precoding Matrix Indication (PMI) and Rank Indication (RI) for notifying the eNB of DL MIMO channel property. PMI and RI indicate the UE-recommended precoding matrix and the number of transmission layers, respectively.

In LTE Rel-10, up to 8 layers are supported for transmission, and 8-Tx codebook is newly defined for DL MIMO of the eNB having 8 transmit antennas. As the number of antennas increases, the width of the beam formed by precoding, resulting in increase of array antenna gain. The enhanced array antenna gain can be accomplished when the eNB can receive the more complex PMI feedback information. In LTE Rel-10, a dual codebook structure is adopted for new 8-TX codebook structure for defining the PMI feedback information. The dual codebook structure defines more precoding matrices in the codebook while reducing feedback overhead. The LTE Rel-10 8-Tx codebook for supporting the dual codebook structure is designed based on the following principles:

For all ranks (ranks 1 to 8), the precoding matrix W is expressed as multiplication of two matrices:

$$W = W_1 W_2$$

$$W_1 \in C_1, W_2 \in C_2$$

$$W_1 = \begin{bmatrix} X & 0 \\ 0 & X \end{bmatrix}$$

defines a block diagonal matrix. $W_1$ is responsible for matching spatial covariance matrices in the bipolar antenna structure having a certain antenna distance (e.g., ½ wavelength or ¼ wavelength).

A minimum of 16 Discrete Fourier Transform (DFT) vectors are generated from $W_1$ and phases are matched via $W_2$. This method is responsible for matching to the spatial covariance of Uniform Linear Array (ULA).

The dual codebook structure secures good performance regardless of the covariance correlation of the DL MIMO channel.

Ranks 1 to 4 codebook design

X denotes a 4×Nb matrix. In each $W_1$, the adjacent beams are designed to be partially overlapped in space. This is to optimize the frequency-selective precoding with the same $W_1$ by adjusting $W_2$.

Codebook design for Rank=1 and 2

X is composed of 32 DFT beams to be applied to 4 transmit antennas. The number of basic DFT beams for 4 transmit antennas is 4 such that 8 multiple oversampling is applied for generating 32 beams.

Beam index: 0, 1, 2, . . . , 31

$W_1$: generate overlapped adjacent beams with Nb=4

Define 16 $W_1$ matrices per rank: {0, 1, 2, 3}, {2, 3, 4, 5}, {4, 5, 6, 7}, . . . , {28, 29, 30, 31}, {30, 31, 0, 1}

$W_2$: Responsible for selection and phase match

Rank-1: generate 16 total precoding matrices using 4 selection hypotheses and 4 Quadrature Phase Shift Keyings (QPSK) phase matching hypotheses.

Rank-2: generate 16 total precoding matrices using 8 selection hypotheses and 2 QPSK phase matching hypotheses.

Design for rank=3 and 4

X is composed of 16 DFT beams to be applied to 4 transmit antennas. 4 multiple oversampling is applied.

Beam index: 0, 1, 2, . . . , 15

$W_1$: generate overlapped adjacent beams with Nb=8

Define 4 $W_1$ matrices per rank: {0, 1, 2, . . . , 7}, {4, 5, 6, . . . , 11}, {8, 9, 10, . . . , 15}, {12, . . . , 15, 0, . . . , 3}

$W_2$: responsible for selection and phase match

Rank-1: generate 16 total precoding matrices using 16 selection hypotheses and 1 QPSK phase matching hypothesis.

Rank-2: generate 8 total precoding matrices using 4 selection hypotheses and 2 QPSK phase matching hypotheses.

Codebook design for ranks 5 to 8

X defines a 4×4 DFT matrix.

Introduce 4 $W_1$ matrices for rank=5, 6, and 7 and one $W_1$ for rank=8

$W_2$ defines one for rank as follows:

$$W_2 = \begin{bmatrix} I & I \\ I & -I \end{bmatrix} \cdot [\text{a fixed } 8xr \text{ column selection matrix}] \text{ where } \begin{bmatrix} I & I \\ I & -I \end{bmatrix}$$

makes possible to use the two bipolar antenna groups at the same rate per transmission layer and guarantees superior performance in the channel environment supporting high rank transmission.

According to the above principles, the codebook $C_1$ defining the precoding matrix $W_1$ is defined as a set including 16 elements in common for rank-1 and rank-2, another set including 4 elements in common for rank-3 and rank-4, another set including 4 elements in common for rank-5, rank-6, and rank-7, and another set including one element for rank-8. The codebook $C_2$ defining the precoding matrix $W_2$ is defined differently according to rank.

The codebook introduced according to the above design principles is defined per rank as shown in tables 6 to 13. In each Table, $i_1$ and $i_2$ denote indices of the codebooks $C_1$ and $C_2$, and variables $\phi_n$ and $v_m$ are as in Equation (1):

$$\phi_n = e^{j\pi n/2}$$

$$v_m = [1 \; e^{j2\pi m/32} \; e^{j4\pi m/32} \; e^{j6\pi m/32}]^T \quad \text{Equation (1)}$$

TABLE 6 codebook for rank-1

| $i_1$ | $i_2$ | | | | | | | |
|---|---|---|---|---|---|---|---|---|
|  | 0 | 1 | 2 | 3 | 4 | 5 | 6 | 7 |
| 0-15 | $W^{(1)}_{2i_1,0}$ | $W^{(1)}_{2i_1,1}$ | $W^{(1)}_{2i_1,2}$ | $W^{(1)}_{2i_1,3}$ | $W^{(1)}_{2i_1+1,0}$ | $W^{(1)}_{2i_1+1,1}$ | $W^{(1)}_{2i_1+1,2}$ | $W^{(1)}_{2i_1+1,3}$ |
| $i_1$ | $i_2$ | | | | | | | |
|  | 8 | 9 | 10 | 11 | 12 | 13 | 14 | 15 |
| 0-15 | $W^{(1)}_{2i_1+2,0}$ | $W^{(1)}_{2i_1+2,1}$ | $W^{(1)}_{2i_1+2,2}$ | $W^{(1)}_{2i_1+2,3}$ | $W^{(1)}_{2i_1+3,0}$ | $W^{(1)}_{2i_1+3,1}$ | $W^{(1)}_{2i_1+3,2}$ | $W^{(1)}_{2i_1+3,3}$ | where $W^{(1)}_{m,n} = \dfrac{1}{\sqrt{8}} \begin{bmatrix} v_m \\ \varphi_n v_m \end{bmatrix}$

TABLE 7 codebook for rank-2

| $i_1$ | $i_2$ | | | |
|---|---|---|---|---|
| | 0 | 1 | 2 | 3 |
| 0-15 | $W^{(2)}_{2i_1,2i_1,0}$ | $W^{(2)}_{2i_1,2i_1,1}$ | $W^{(2)}_{2i_1+1,2i_1,0}$ | $W^{(2)}_{2i_1+1,2i_1,1}$ |

| $i_1$ | $i_2$ | | | |
|---|---|---|---|---|
| | 4 | 5 | 6 | 7 |
| 0-15 | $W^{(2)}_{2i_1+2,2i_1+2,0}$ | $W^{(2)}_{2i_1+2,2i_1+2,1}$ | $W^{(2)}_{2i_1+3,2i_1+3,0}$ | $W^{(2)}_{2i_1+3,2i_1+3,1}$ |

| $i_1$ | $i_2$ | | | |
|---|---|---|---|---|
| | 8 | 9 | 10 | 11 |
| 0-15 | $W^{(2)}_{2i_1,2i_1+1,0}$ | $W^{(2)}_{2i_1,2i_1+1,1}$ | $W^{(2)}_{2i_1+1,2i_1+2,0}$ | $W^{(2)}_{2i_1+1,2i_1+2,1}$ |

| $i_1$ | $i_2$ | | | |
|---|---|---|---|---|
| | 12 | 13 | 14 | 15 |
| 0-15 | $W^{(2)}_{2i_1,2i_1+3,0}$ | $W^{(2)}_{2i_1,2i_1+3,1}$ | $W^{(2)}_{2i_1+1,2i_1+3,0}$ | $W^{(2)}_{2i_1+1,2i_1+3,1}$ | where $W^{(2)}_{m,m',n} = \dfrac{1}{4}\begin{bmatrix} v_m & v_{m'} \\ \varphi_n v_m & -\varphi_n v_{m'} \end{bmatrix}$

TABLE 8 codebook for rank-3

| $i_1$ | $i_2$ | | | |
|---|---|---|---|---|
| | 0 | 1 | 2 | 3 |
| 0-3 | $W^{(3)}_{8i_1,8i_1,8i_1+8}$ | $W^{(3)}_{8i_1+8,8i_1,8i_1+8}$ | $\tilde{W}^{(3)}_{8i_1,8i_1+8,8i_1+8}$ | $\tilde{W}^{(3)}_{8i_1+8,8i_1,8i_1}$ |

| $i_1$ | $i_2$ | | | |
|---|---|---|---|---|
| | 4 | 5 | 6 | 7 |
| 0-3 | $W^{(3)}_{8i_1+2,8i_1+2,4i_1+10}$ | $W^{(3)}_{8i_1+10,8i_1+2,8i_1+10}$ | $\tilde{W}^{(3)}_{8i_1+2,8i_1+10,8i_1+10}$ | $\tilde{W}^{(3)}_{8i_1+10,8i_1+2,8i_1+2}$ |

| $i_1$ | $i_2$ | | | |
|---|---|---|---|---|
| | 8 | 9 | 10 | 11 |
| 0-3 | $W^{(3)}_{8i_1+4,8i_1+4,8i_1+12}$ | $W^{(3)}_{8i_1+12,8i_1+4,8i_1+12}$ | $\tilde{W}^{(3)}_{8i_1+4,8i_1+12,8i_1+12}$ | $\tilde{W}^{(3)}_{8i_1+12,8i_1+4,8i_1+4}$ |

| $i_1$ | $i_2$ | | | |
|---|---|---|---|---|
| | 12 | 13 | 14 | 15 |
| 0-3 | $W^{(3)}_{8i_1+6,8i_1+6,8i_1+14}$ | $W^{(3)}_{8i_1+14,8i_1+6,8i_1+14}$ | $\tilde{W}^{(3)}_{8i_1+6,8i_1+14,8i_1+14}$ | $\tilde{W}^{(3)}_{8i_1+14,8i_1+6,8i_1+6}$ | where $W^{(3)}_{m,m',m''} = \dfrac{1}{\sqrt{24}}\begin{bmatrix} v_m & v_{m'} & v_{m''} \\ v_m & -v_{m'} & -v_{m''} \end{bmatrix}$, $\tilde{W}^{(3)}_{m,m',m''} = \dfrac{1}{\sqrt{24}}\begin{bmatrix} v_m & v_{m'} & v_{m''} \\ v_m & -v_{m'} & -v_{m''} \end{bmatrix}$

TABLE 9 codebook for rank-4

| $i_1$ | $i_2$ | | | |
|---|---|---|---|---|
| | 0 | 1 | 2 | 3 |
| 0-3 | $W^{(4)}_{8i_1,8i_1+8,0}$ | $W^{(4)}_{8i_1,8i_1+8,1}$ | $W^{(4)}_{8i_1+2,8i_1+10,0}$ | $W^{(4)}_{8i_1+2,8i_1+10,1}$ |

TABLE 9-continued codebook for rank-4

| $i_1$ | $i_2$ | | | |
|---|---|---|---|---|
| | 4 | 5 | 6 | 7 |
| 0-3 | $W^{(4)}_{8i_1+4,8i_1+12,0}$ | $W^{(4)}_{8i_1+4,8i_1+12,1}$ | $W^{(4)}_{8i_1+6,8i_1+14,0}$ | $W^{(4)}_{8i_1+6,8i_1+14,1}$ | where $W^{(4)}_{m,m',n} = \dfrac{1}{\sqrt{32}}\begin{bmatrix} v_m & v_{m'} & v_m & v_{m'} \\ \varphi_n v_m & \varphi_n v_{m'} & -\varphi_n v_m & -\varphi_n v_{m'} \end{bmatrix}$

TABLE 10 codebook for rank-5

| $i_1$ | $i_2$ |
|---|---|
| | 0 |
| 0-3 | $W^{(5)}_{i_1} = \dfrac{1}{\sqrt{40}}\begin{bmatrix} v_{2i_1} & v_{2i_1} & v_{2i_1+8} & v_{2i_1+8} & v_{2i_1+16} \\ v_{2i_1} & -v_{2i_1} & v_{2i_1+8} & -v_{2i_1+8} & v_{2i_1+16} \end{bmatrix}$ |

TABLE 11 codebook for rank-6

| $i_1$ | $i_2$ |
|---|---|
| | 0 |
| 0-3 | $W^{(5)}_{i_1} = \dfrac{1}{\sqrt{40}}\begin{bmatrix} v_{2i_1} & v_{2i_1} & v_{2i_1+8} & v_{2i_1+8} & v_{2i_1+16} \\ v_{2i_1} & -v_{2i_1} & v_{2i_1+8} & -v_{2i_1+8} & v_{2i_1+16} \end{bmatrix}$ |

TABLE 12 codebook for rank-7

| $i_1$ | $i_2$ |
|---|---|
| | 0 |
| 0-3 | $W_{i_1}^{(7)} = \frac{1}{\sqrt{56}} \begin{bmatrix} v_{2i_1} & v_{2i_1} & v_{2i_1+8} & v_{2i_1+8} & v_{2i_1+16} & v_{2i_1+16} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} \end{bmatrix}$ |

TABLE 13 codebook for rank-8

| $i_1$ | $i_2$ |
|---|---|
| | 0 |
| 0 | $W_{i_1}^{(8)} = \frac{1}{8} \begin{bmatrix} v_{2i_1} & v_{2i_1} & v_{2i_1+8} & v_{2i_1+8} & v_{2i_1+16} & v_{2i_1+16} & v_{2i_1+24} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} & -v_{2i_1+24} \end{bmatrix}$ |

In the related art system based on the LTE Rel-8, the codebook subset restriction must be applied to DL MIMO using 8 transmit antennas in LTE Rel-10. Exemplary embodiments of the present invention provide an efficient signaling method for applying the codebook subset restriction to the 8-transmit antenna codebook.

In LTE Rel-10, transmission modes 9 and 10 are newly added. Transmission mode 9 supports up to 8 layers transmission using the DM-RS. The transmission mode 10 is designed with a condition allowing only one layer transmission, which reduces the size of DCI significantly. The relationship between the transmission modes 9 and 10 is identical with the relationship between the transmission modes 4 and 6 in LTE Rel-8. The transmission modes 6 and 10 are restricted so as to support only the single layer transmission, and thus there is no need to define the control signal for the second codeword such as Modulation and Coding Scheme (MCS), New Data Indicator (NDI), and Redundancy Version (RV). In the transmission mode 10, only the rank-1 precoding is effective according to the single layer transmission restriction. Accordingly, the CSR bitmap for transmission mode 10 is reduced in size due to the selection restricted to rank-1 precoding.

Table 14 summarizes codebook sizes of for 8 transmit antennas per rank in LTE Rel-10

TABLE 14 codebook size

| | Codebook size Rank | | | | | | | |
|---|---|---|---|---|---|---|---|---|
| | 1 | 2 | 3 | 4 | 5 | 6 | 7 | 8 |
| $n(C_1)$ | 16 | 16 | 4 | 4 | 4 | 4 | 4 | 1 |
| $n(C_2)$ | 16 | 16 | 16 | 8 | 1 | 1 | 1 | 1 |
| $n(C_1 \times C_2)$ | 256 | 256 | 64 | 32 | 4 | 4 | 4 | 1 |

First Exemplary Embodiment

In the first exemplary embodiment, a bitmap is defined for restricting subsets in the 8-Tx codebook for LTE Rel-10 that can restrict all the definable precoding matrixes. The CSR bitmap size according to the first exemplary embodiment of the present invention is summarized as shown in Table 15.

TABLE 15

CSR bitmap sizes per transmission mode according to the first exemplary embodiment

| Transmission mode | Number of bits AC | | |
|---|---|---|---|
| | 2 antenna ports | 4 antenna ports | 8 antenna ports |
| 3 | 2 | 4 | — |
| 4 | 6 | 64 | — |
| 5 | 4 | 16 | — |
| 6 | 4 | 16 | — |
| 9 | 6 | 64 | 621 |
| 10 | 4 | 16 | 256 |

In transmission mode 9, the total number of precoding matrices is 621 because all the ranks are supported.

Exemplary embodiment 1-1: $i_1$ preference mapping

In the exemplary embodiment 1-1, the bitmap of codebook $C_1$ for $W_1$ is arranged first. In this case, individual bits of the bitmap are interpreted as follows.

Transmission Mode 9

2 TX antennas: Refer to Table 5

4 TX antennas: Bit $a_{16(v-1)+i}$ is designated for the precoding matrix corresponding to the codebook index i in Table 3 and rank v.

8 TX antennas: Bit $a_{g(v)+i_2 f(v)+i_1}$ is designated for the precoding matrix corresponding to the codebook index pair ($i_1$, $i_2$) in tables 6 to 13 and the rank v. Here, $$g(v) = \begin{cases} 0 & \text{for } v = 1 \\ 256 & \text{for } v = 2 \\ 512 & \text{for } v = 3 \\ 576 & \text{for } v = 4 \\ 608 & \text{for } v = 5 \\ 612 & \text{for } v = 6 \\ 616 & \text{for } v = 7 \\ 620 & \text{for } v = 8 \end{cases}, f(v) = \begin{cases} 16 & \text{for } v = 1, 2 \\ 4 & \text{for } v = 3, 4, 5, 6, 7 \end{cases}$$

Transmission mode 10

2 TX antennas: Bit $a_i$ is designated for the precoding matrix corresponding to the codebook index i in Table 2 and rank value v=1.

4 TX antennas: Bit $a_i$ is designated for the precoding matrix corresponding to the codebook index i in Table 3 and rank value v=1.

8 TX antennas: Bit $a_{16i_1+i_2}$ is designated for the precoding matrix corresponding to the codebook index pair ($i_1$, $i_2$) in Table 6 and rank value v=1. In the equations, g(v) is the function indicating the total number of precoding matrices of which rank is less than v, and $f$(v) is the function indicating the size of codebook $C_1$. For reference, although $f$(8)=1 according to the definition of function $f$(v), there is no need to define $f$(8)=1 separately because $i_2$=0 for v=8.

Exemplary embodiment 1-2: $i_2$ preference mapping

In the exemplary embodiment 1-2, the bitmap of codebook $C_2$ for $W_2$ is arranged first. In this case, individual bits of the bitmap are interpreted as follows.

Transmission Mode 9

2 TX antennas: Refer to Table 5

4 TX antennas: Bit $a_{16(v-1)+i}$ is designated for the precoding matrix corresponding to the codebook index i in Table 3 and rank value v.

8 TX antennas: Bit $a_{g(v)+i_1 f(v)+i_2}$ is designated for the precoding matrix corresponding to the codebook index pair ($i_1$, $i_2$) in tables 6 to 13 and the rank value v.

$$\text{Here, } g(v) = \begin{cases} 0 & \text{for } v = 1 \\ 256 & \text{for } v = 2 \\ 512 & \text{for } v = 3 \\ 576 & \text{for } v = 4 \\ 608 & \text{for } v = 5 \\ 612 & \text{for } v = 6 \\ 616 & \text{for } v = 7 \\ 620 & \text{for } v = 8 \end{cases}, f(v) = \begin{cases} 16 & \text{for } v = 1, 2, 3 \\ 8 & \text{for } v = 4 \\ 1 & \text{for } v = 5, 6, 7 \end{cases}$$

Transmission mode 10

2 TX antennas: Bit $a_i$ is designated for the precoding matrix corresponding to the codebook index i in Table 2 and rank value v=1.

4 TX antennas: Bit $a_i$ is designated for the precoding matrix corresponding to the codebook index i in Table 3 and rank value v=1.

8 TX antennas: Bit $a_{16i_1+i_2}$ is designated for the precoding matrix corresponding to the codebook index pair ($i_1$, $i_2$) in Table 6 and rank value v=1. In the equations, g(v) is the function indicating the total number of precoding matrices of which rank is less than v as in the exemplary embodiment 1-1, and $f$(v) is the function indicating the size of codebook $C_2$. For reference, although $f$(8)=1 according to the definition of function $f$(v), there is no need to defining $f$(8) separately because $i_1$=0 for v=8.

Second Exemplary Embodiment

In the second exemplary embodiment, the bitmaps for the respective codebooks $C_1$ and $C_2$ are defined for subset restriction in 8-TX codebook for LTE Rel-10.

Exemplary Embodiment 2-1

Separate Bitmap Signaling

In the exemplary embodiment 2-1, two bitmaps $B_1$ and $B_2$ are introduced with the definition of the codebook subset restriction for the respective codebooks $C_1$ and $C_2$.

The bitmaps $B_1$ and $B_2$ can be expressed by bit streams as follows:

$$B_1 = \left\{ a^{(1)}_{A_C^{(1)}-1}, \ldots, a^{(1)}_3, a^{(1)}_2, a^{(1)}_1, a^{(1)}_0 \right\}$$

$$B_2 = \left\{ a^{(2)}_{A_C^{(2)}-1}, \ldots, a^{(2)}_3, a^{(2)}_2, a^{(2)}_1, a^{(2)}_0 \right\}$$

where $A_C^{(1)}$ and $A_C^{(2)}$ denote the number of bits of the respective bitmaps $B_1$ and $B_2$. As summarized in Table 14, the codebooks $C_1$ and $C_2$ include 55 and 40 precoding) matrices, respectively. Table 16 summarizes the bitmap sizes $A_C^{(1)}$ and $A_C^{(2)}$.

Table 16

CSR bitmap size per transmission mode in the exemplary embodiment 2-1

| Transmission mode | Number of bits AC | | | Number of bits $A_C^{(1)}$ | Number of bits $A_C^{(2)}$ |
|---|---|---|---|---|---|
| | 2 antenna ports | 4 antenna ports | 8 antenna ports | | |
| 3 | 2 | 4 | — | — | |
| 4 | 6 | 64 | — | — | |
| 5 | 4 | 16 | — | — | |
| 6 | 4 | 16 | — | — | |
| 9 | 6 | 64 | 53 | 60 | |
| 10 | 4 | 16 | 16 | 16 | |

In the exemplary embodiment 2-1, individual bits of the bitmap are interpreted as follows.

Transmission Mode 9

2 TX antennas: Refer to Table 5

4 TX antennas: Bit $a_{16(v-1)+i}$ is designated for the precoding matrix corresponding to the codebook index i in Table 3 and rank v.

8 TX antennas: Bit $a_{f^{(1)}(v)+i_1}^{(1)}$, is designated for the precoding matrix corresponding to the codebook index $i_1$ in tables 6 to 13 and the rank v. Here, $$f^{(1)}(v) = \begin{cases} 0 & \text{for } v = 1 \\ 16 & \text{for } v = 2 \\ 32 & \text{for } v = 3 \\ 36 & \text{for } v = 4 \\ 40 & \text{for } v = 5 \\ 44 & \text{for } v = 6 \\ 48 & \text{for } v = 7 \\ 52 & \text{for } v = 8 \end{cases}.$$

Bit $a_{f^{(2)}(v)+i_2}^{(2)}$ is designated for the precoding matrix corresponding to the codebook index $i_2$ in tables 6 to 13 and the rank value v. Here, $$f^{(2)}(v) = \begin{cases} 0 & \text{for } v=1 \\ 16 & \text{for } v=2 \\ 32 & \text{for } v=3 \\ 48 & \text{for } v=4 \\ 56 & \text{for } v=5 \\ 57 & \text{for } v=6 \\ 58 & \text{for } v=7 \\ 59 & \text{for } v=8 \end{cases}$$

Transmission mode 10

2 TX antennas: Bit $a_i$ is designated for the precoding matrix corresponding to the codebook index i in Table 2 and rank value v=1.

4 TX antennas: Bit $a_i$ is designated for the precoding matrix corresponding to the codebook index i in Table 3 and rank value v=1.

8 TX antennas: Bit $a_{i_1}^{(1)}$ is designated for the precoding matrix corresponding to the codebook index $i_1$ in Table 6 and rank value v=1. Bit $a_{i_2}^{(2)}$ is designated for the precoding matrix corresponding to $i_2$ in Table 6 and rank value v=1. In the equations, $f^{(1)}(v)$ and $f^{(2)}(v)$ are the functions indicating the total number of precoding matrices of which ranks are less than v in the respective codebooks $C_1$ and $C_2$.

Exemplary Embodiment 2-2

Define Single Bitmap in the Form of $\{B_2,B_1\}$

In the exemplary embodiment 2-2, the bitmaps $B_1$ and $B_2$ are defined in the same manner as exemplary embodiment 2-1 and then combined in a certain order to generate an integrated bitmap B. The bitmap B is defined as Equation (2):)

$$B = \{a_{A_C-1}, \ldots, a_1, a_0\} \qquad \text{Equation (2)}$$
$$= \{B_2, B_1\}$$
$$= \left\{ a_{A_C^{(2)}-1}^{(2)}, \ldots, a_1^{(2)}, a_0^{(2)}, a_{A_C^{(1)}-1}^{(1)}, \ldots, a_1^{(1)}, a_0^{(1)} \right\}$$

The size of bitmap B $A_C = A_C^{(1)} + A_C^{(2)}$ is determined as shown in Table 17 derived from Table 16.

TABLE 17

CSR bitmap size per transmission mode
according to exemplary embodiments 2-2 and 2-3

| Transmission mode | Number of bits AC | | |
|---|---|---|---|
| | 2 antenna ports | 4 antenna ports | 8 antenna ports |
| 3 | 2 | 4 | — |
| 4 | 6 | 64 | — |
| 5 | 4 | 16 | — |
| 6 | 4 | 16 | — |
| 9 | 6 | 64 | 113 |
| 10 | 4 | 16 | 32 |

In the exemplary embodiment 2-2, individual bits of the bitmap are interpreted as follows.
Transmission Mode 9
2 TX antennas: Refer to Table 5
4 TX antennas: Bit $a_{16(v-1)+i}$ is designated for the precoding matrix corresponding to the codebook index i in Table 3 and rank value v.

8 TX antennas: Bit $a_{53(\chi-1)+f^{(\chi)}(v)+i_\chi}$ is designated for the precoding matrix corresponding to the codebook index $i_\chi$ ($\chi$=1,2) in tables 6 to 13 and the rank value v. Here, $$f^{(1)}(v) = \begin{cases} 0 & \text{for } v=1 \\ 16 & \text{for } v=2 \\ 32 & \text{for } v=3 \\ 36 & \text{for } v=4 \\ 40 & \text{for } v=5 \\ 44 & \text{for } v=6 \\ 48 & \text{for } v=7 \\ 52 & \text{for } v=8 \end{cases}, \quad f^{(2)}(v) = \begin{cases} 0 & \text{for } v=1 \\ 16 & \text{for } v=2 \\ 32 & \text{for } v=3 \\ 48 & \text{for } v=4 \\ 56 & \text{for } v=5 \\ 57 & \text{for } v=6 \\ 58 & \text{for } v=7 \\ 59 & \text{for } v=8 \end{cases}$$

Transmission mode 10

2 TX antennas: Bit $a_i$ is designated for the precoding matrix corresponding to the codebook index i in Table 2 and rank value y=1.

4 TX antennas: Bit $a_i$ is designated for the precoding matrix corresponding to the codebook index i in Table 3 and rank value y=1.

8 TX antennas: Bit $a_{16(\chi-1)+i_\chi}$ is designated for the precoding matrix corresponding to the codebook index $i_\chi$ ($\chi$=1,2) in Table 6 and rank value v=1.

Exemplary Embodiment 2-3

Define Single Bitmap in the Form of $\{B_1,B_2\}$

In the exemplary embodiment 2-3, the integrated bitmap B is produced in the same manner as exemplary embodiment 2-2 except that the two bitmaps are arranged in order of $\{B_1,B_2\}$. The bitmap B is defined as Equation (3):

$$B = \{a_{A_C-1}, \ldots, a_1, a_0\} \qquad \text{Equation (3)}$$
$$= \{B_1, B_2\}$$
$$= \left\{ a_{A_C^{(1)}-1}^{(1)}, \ldots, a_1^{(1)}, a_0^{(1)}, a_{A_C^{(2)}-1}^{(2)}, \ldots, a_1^{(2)}, a_0^{(2)} \right\}$$

The size of bitmap B $A_C = A_C^{(1)} + A_C^{(2)}$ is determined as shown in Table 17 derived from Table 16. Since the individual bits of the bitmap according to exemplary embodiment 2-3 are interpreted in the same manner as the bitmap according to exemplary embodiment 2-2, detailed description thereon is omitted herein.

Third Exemplary Embodiment

In the third exemplary embodiment, the bitmaps for the respective codebooks $C_1$ and $C_2$ are defined for subset restriction in 8-Tx codebook for LTE Rel-10, and unnecessary bits are removed from the CSR bitmap $B_2$ for the codebook $C_2$.

In the codebook $C_2$, one precoding matrix is defined for each of rank-5 to rank-8. If any of the precoding matrices of codebook $C_1$ is not restricted for one of rank-5 to rank-8, the precoding matrix of codebook $C_2$ is valid. If all the precoding matrices of codebook $C_1$ are restricted, the codebook $C_2$ is invalid. For example, if all the 4 types of precoding matrix $W_1$ that are defined in the codebook $C_1$ are restricted for rank-7, the UE cannot select a precoding matrix for used in rank-7 transmission and thus there is no way to select the precoding matrix in the codebook $C_2$ for rank-7. If there is at least one precoding matrix $W_1$ which is not restricted in the codeword $C_1$, the UE can select a preferred $W_1$ of rank-7 for feedback, resulting in selection of precoding matrix $W_2$ in the codebook $C_2$ for rank-7. Accordingly, there is no need of the CSR bitmap for rank-5 to rank-8 in codebook $C_2$.

Table 18 summarizes the number bits required for CSR signaling after removing unnecessary bits.

TABLE 18 number of bits necessary for CSR signaling according to third exemplary embodiment

| | Required number of bits for codebook subset restriction signaling Rank | | | | | | | | |
|---|---|---|---|---|---|---|---|---|---|
| | 1 | 2 | 3 | 4 | 5 | 6 | 7 | 8 | Sum |
| $n(C_1)$ | 16 | 16 | 4 | 4 | 4 | 4 | 4 | 1 | 53 |
| $n(C_2)$ | 16 | 16 | 16 | 8 | — | — | — | — | 56 |

Exemplary Embodiment 3-1

Separate Bitmap Signaling

In the exemplary embodiment 3-1, two bitmaps $B_1$ and $B_2$ are introduced with the definition for applying the codebook subset restriction to the respective codebooks $C_1$ and $C_2$. The bitmaps $B_1$ and $B_2$ can be expressed by bit streams as follows:

$$B_1 = \{a^{(1)}_{A_C^{(1)}-1}, \ldots, a^{(1)}_3, a^{(1)}_2, a^{(1)}_1, a^{(1)}_0\}$$

$$B_2 = \{a^{(2)}_{A_C^{(2)}-1}, \ldots, a^{(2)}_3, a^{(2)}_2, a^{(2)}_1, a^{(2)}_0\}$$

where $A_C^{(1)}$ and $A_C^{(2)}$ denote numbers of bits of the respective bitmaps $B_1$ and $B_2$. As summarized in Table 18, the codebooks $C_1$ and $C_2$ include 53 and 56 precoding matrices, respectively. Table 19 summarizes the bitmap sizes $A_C^{(1)}$ and $A_C^{(2)}$.

TABLE 19

CSR bitmap size per transmission mode in the exemplary embodiment 3-1

| Transmission mode | Number of bits AC 2 antenna ports | Number of bits $A_C^{(1)}$ 4 antenna ports | Number of bits $A_C^{(2)}$ 8 antenna ports | |
|---|---|---|---|---|
| 3 | 2 | 4 | — | — |
| 4 | 6 | 64 | — | — |
| 5 | 4 | 16 | — | — |
| 6 | 4 | 16 | — | — |
| 9 | 6 | 64 | 53 | 56 |
| 10 | 4 | 16 | 16 | 16 |

In the exemplary embodiment 3-1, individual bits of the bitmap are interpreted as follows.

Transmission Mode 9

2 TX antennas: Refer to Table 5

4 TX antennas: Bit $a_{16(v-1)+i}$ is designated for the precoding matrix corresponding to the codebook index i in Table 3 and rank v.

8 TX antennas: Bit $a^{(1)}_{f^{(1)}(v)+i_1}$ is designated for the precoding matrix corresponding to the codebook index $i_1$ in tables 6 to 13 and the rank v. Here, $$f^{(1)}(v) = \begin{cases} 0 & \text{for } v = 1 \\ 16 & \text{for } v = 2 \\ 32 & \text{for } v = 3 \\ 36 & \text{for } v = 4 \\ 40 & \text{for } v = 5 \\ 44 & \text{for } v = 6 \\ 48 & \text{for } v = 7 \\ 52 & \text{for } v = 8 \end{cases}.$$

Bit $a^{(2)}_{f^{(2)}(v)+i_2}$ is designated for the precoding matrix corresponding to the codebook index $i_2$ in tables 6 to 13 and the rank value v. Here, $$f^{(2)}(v) = \begin{cases} 0 & \text{for } v = 1 \\ 16 & \text{for } v = 2 \\ 32 & \text{for } v = 3 \\ 48 & \text{for } v = 4 \end{cases}.$$

In the bitmap $B_2$, no CSR bit is necessary for rank-5 to rank-8 and thus there is no need to define the function $f^{(2)}(v)$ for v=5, 6, 7, 8

The third exemplary embodiment is identical with the second exemplary embodiment except for the modification in rank-5 to rank-8, as a result, the transmission mode 10 designed for supporting only rank-1 are identical in both the two exemplary embodiments.

Figure 4:
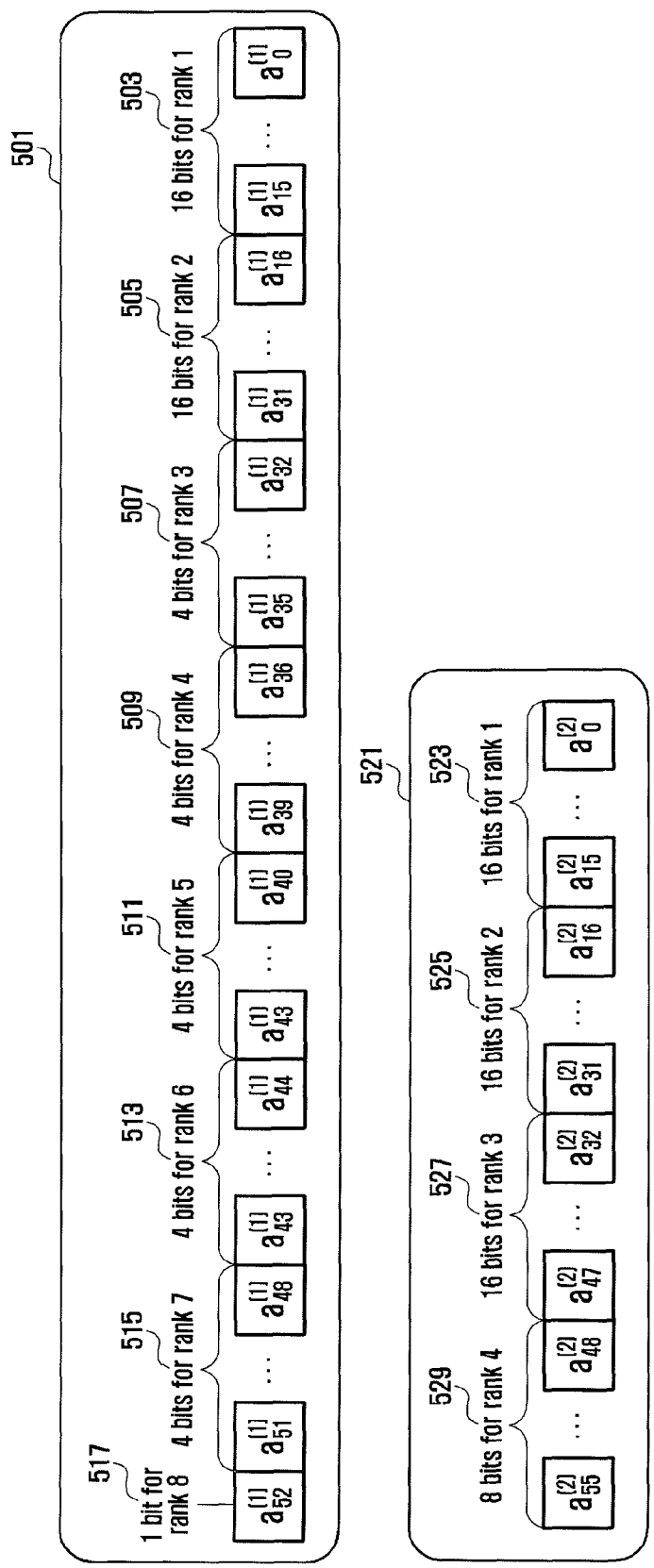
FIG. 4 is a diagram illustrating a CSR bitmap according to the exemplary embodiment 3-1 of the present invention.

FIG. 4 is a diagram illustrating the CSR bitmap according to the exemplary embodiment 3-1 of the present invention.

Referring to FIG. 4, reference number 501 denotes the bitmap $B_1$ for codebook $C_1$, reference number 521 denotes the bitmap $B_2$ for codebook $C_2$. The bitmap $B_1$ is composed of total 53 bits with the Most Significant Bit (MSB) 517 corresponding to the precoding matrix defined for rank-8. The bits 503, 505, 507, 509, 511, 513, 515, and 517 correspond to the precoding matrices for rank-1, rank-2, rank-3, rank-4, rank-5, rank-6, rank-7, and rank-8, respectively. The bitmap $B_2$ is composed of total 56 bits and bits 523, 525, 527, and 529 correspond to the precoding matrices for rank-1, rank-2, rank-3, and rank-4, respectively.

Exemplary Embodiment 3-2

Define Single Bitmap in the Form of $\{B_2, B_1\}$

In the exemplary embodiment 3-2, the bitmaps $B_1$ and $B_2$ are defined in the same manner as exemplary embodiment 3-1 and then combined in a certain order to generate an integrated bitmap B. The bitmap B is defined as Equation (2). The size of bitmap B $A_C = A_C^{(1)} + A_C^{(2)}$ is summarized as shown in Table 20 derived from Table 19.

TABLE 20

CSR bitmap size per transmission mode according to exemplary embodiments 3-2 and 3-3

| Transmission mode | Number of bits AC | | |
|---|---|---|---|
| | 2 antenna ports | 4 antenna ports | 8 antenna ports |
| 3 | 2 | 4 | — |
| 4 | 6 | 64 | — |
| 5 | 4 | 16 | — |

TABLE 20-continued

CSR bitmap size per transmission mode
according to exemplary embodiments 3-2 and 3-3

| Transmission mode | Number of bits AC | | |
|---|---|---|---|
| | 2 antenna ports | 4 antenna ports | 8 antenna ports |
| 6 | 4 | 16 | — |
| 9 | 6 | 64 | 109 |
| 10 | 4 | 16 | 32 |

In the exemplary embodiment 3-2, individual bits of the bitmap are interpreted as follows.

Transmission Mode 9

2 TX antennas: Refer to Table 5

4 TX antennas: Bit $a_{16(v-1)+i}$ is designated for the precoding matrix corresponding to the codebook index i in Table 3 and rank value v.

8 TX antennas: Bit $a_{53(\chi-1)+f^{(\chi)}(v)+i_\chi}$ is designated for the precoding matrix corresponding to the codebook index $i_\chi$ ($\chi=1,2$) in tables 6 to 13 and the rank value v. Here, $$f^{(1)}(v) = \begin{cases} 0 & \text{for } v=1 \\ 16 & \text{for } v=2 \\ 32 & \text{for } v=3 \\ 36 & \text{for } v=4 \\ 40 & \text{for } v=5 \\ 44 & \text{for } v=6 \\ 48 & \text{for } v=7 \\ 52 & \text{for } v=8 \end{cases}, \text{ and } f^{(2)}(v) = \begin{cases} 0 & \text{for } v=1 \\ 16 & \text{for } v=2 \\ 32 & \text{for } v=3 \\ 48 & \text{for } v=4 \end{cases}.$$

Figure 5:
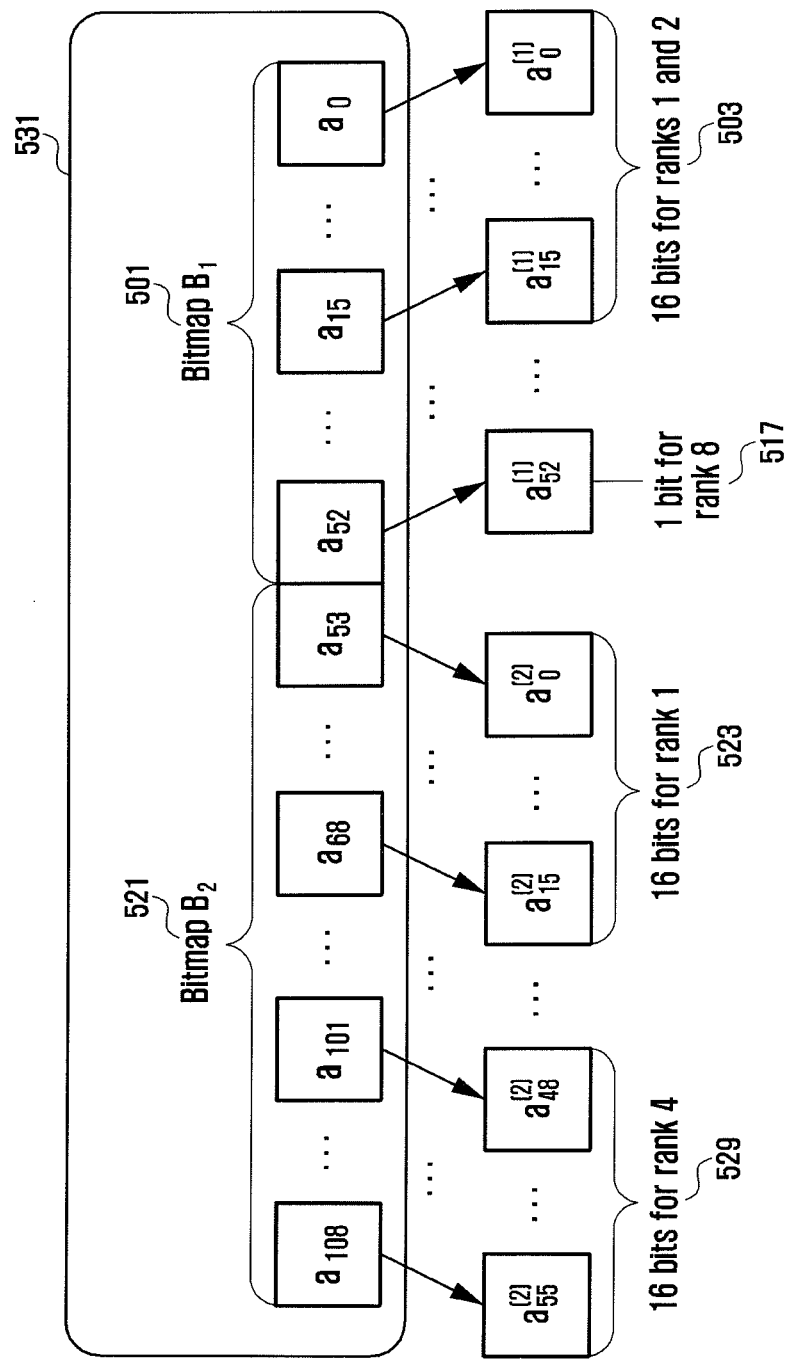
FIG. 5 is a diagram illustrating a CRS bitmap according to the exemplary embodiment 3-2 of the present invention.

FIG. 5 is a diagram illustrating a CRS bitmap according to the exemplary embodiment 3-2 of the present invention.

Referring to FIG. 5, reference number 531 denotes the bitmap B produced by combining the bitmap $B_1$ 501 for the codebook $C_1$ and the bitmap $B_2$ 521 for the codebook $C_2$. As shown in FIG. 5, the bitmaps are arranged in order of $B_2$ 521 and $B_1$ 501.

Exemplary Embodiment 3-3

Define Single Bitmap in the Form of $\{B_1, B_2\}$

In the exemplary embodiment 3-3, the integrated bitmap B is produced in the same manner as exemplary embodiment 3-2 except that the two bitmaps are arranged in order of $\{B_1, B_2\}$. The bitmap B is defined as Equation (3).

The size of bitmap B $A_C = A_C^{(1)} + A_C^{(2)}$ is determined as shown in Table 20 derived from Table 19. Since the individual bits of the bitmap according to exemplary embodiment 3-3 are interpreted in the same manner as the bitmap according to exemplary embodiment 3-2, detailed description thereon is omitted herein.

Fourth Exemplary Embodiment

In the fourth exemplary embodiment, the bitmaps for the respective codebooks $C_1$ and $C_2$ are defined for subset restriction in 8-Tx codebook for LTE Rel-10 with the significant reduction of the size of the CSR bitmap $B_1$ for codebook $C_1$ in such a manner that the ranks using the same $W_1$ share the same bits according to the dual codebook design principle. In the dual codebook design principle, the codebook $C_1$ is defined with a set for rank-1 and rank-2 in common, a set for rank-3 and rank-4 in common, a set for rank-5, rank-6, and rank-7 in common, and a set for rank-8. With this characteristic, the codebook size is determined as shown in Table 21. The size of the CSR bitmap $B_1$ for codebook $C_1$ is reduced to 25.

TABLE 21 size of codebook according to fourth exemplary embodiment

| | Codebook size Rank | | | | | | | | |
|---|---|---|---|---|---|---|---|---|---|
| | 1 | 2 | 3 | 4 | 5 | 6 | 7 | 8 | Sum |
| $n(C_1)$ | 16 | | 4 | | | 4 | | 1 | 25 |
| $n(C_2)$ | 16 | 16 | 16 | 8 | 1 | 1 | 1 | 1 | 60 |
| $n(C_1 \times C_2)$ | 256 | 256 | 64 | 32 | 4 | 4 | 4 | 1 | 621 |

Exemplary Embodiment 4-1

Separate Bitmap Signaling

In the exemplary embodiment 4-1, two bitmaps $B_1$ and $B_2$ are introduced with the definition for applying the codebook subset restriction to the respective codebooks $C_1$ and $C_2$. The bitmaps $B_1$ and $B_2$ can be expressed by bit streams as follows:

$$B_1 = \left\{ a^{(1)}_{A_C^{(1)}-1}, \ldots, a^{(1)}_3, a^{(1)}_2, a^{(1)}_1, a^{(1)}_0 \right\}$$

$$B_2 = \left\{ a^{(2)}_{A_C^{(2)}-1}, \ldots, a^{(2)}_3, a^{(2)}_2, a^{(2)}_1, a^{(2)}_0 \right\}$$

where $A_C^{(1)}$ and $A_C^{(2)}$ denote numbers of bits of the respective bitmaps $B_1$ and $B_2$. As summarized in Table 21, the codebooks $C_1$ and $C_2$ include 25 and 60 precoding matrices, respectively. Table 22 summarizes the bitmap sizes $A_C^{(1)}$ and $A_C^{(2)}$.

TABLE 22

CSR bitmap size per transmission mode
in exemplary embodiment 4-1

| | Number of bits AC | | Number of bits $A_C^{(1)}$ | Number of bits $A_C^{(2)}$ |
|---|---|---|---|---|
| Transmission mode | 2 antenna ports | 4 antenna ports | 8 antenna ports | |
| 3 | 2 | 4 | — | — |
| 4 | 6 | 64 | — | — |
| 5 | 4 | 16 | — | — |
| 6 | 4 | 16 | — | — |
| 9 | 6 | 64 | 25 | 60 |
| 10 | 4 | 16 | 16 | 16 |

In the exemplary embodiment 4-1, individual bits of the bitmap are interpreted as follows.

Transmission Mode 9

2 TX antennas: Refer to Table 5

4 TX antennas: Bit $a_{16(v-1)+i}$ is designated for the precoding matrix corresponding to the codebook index i in Table 3 and rank v.

8 TX antennas: Bit $a_{f^{(1)}(v)+i_1}^{(1)}$ is designated for the precoding matrix corresponding to the codebook index $i_1$ in tables 6 to 13 and the rank v. Here, $$f^{(1)}(v) = \begin{cases} 0 & \text{for } v = 1, 2 \\ 16 & \text{for } v = 3, 4 \\ 20 & \text{for } v = 5, 6, 7 \\ 24 & \text{for } v = 8 \end{cases}.$$

Bit $a_{f^{(2)}(v)+i_2}^{(2)}$ is designated for the precoding matrix corresponding to the codebook index $i_2$ in tables 6 to 13 and the rank value v. Here, $$f^{(2)}(v) = \begin{cases} 0 & \text{for } v = 1 \\ 16 & \text{for } v = 2 \\ 32 & \text{for } v = 3 \\ 48 & \text{for } v = 4 \\ 56 & \text{for } v = 5 \\ 57 & \text{for } v = 6 \\ 58 & \text{for } v = 7 \\ 59 & \text{for } v = 8 \end{cases}.$$

In the case of transmission mode 10 designed for supporting only rank-1, there is no difference between the fourth and second exemplary embodiments.

Figure 6:
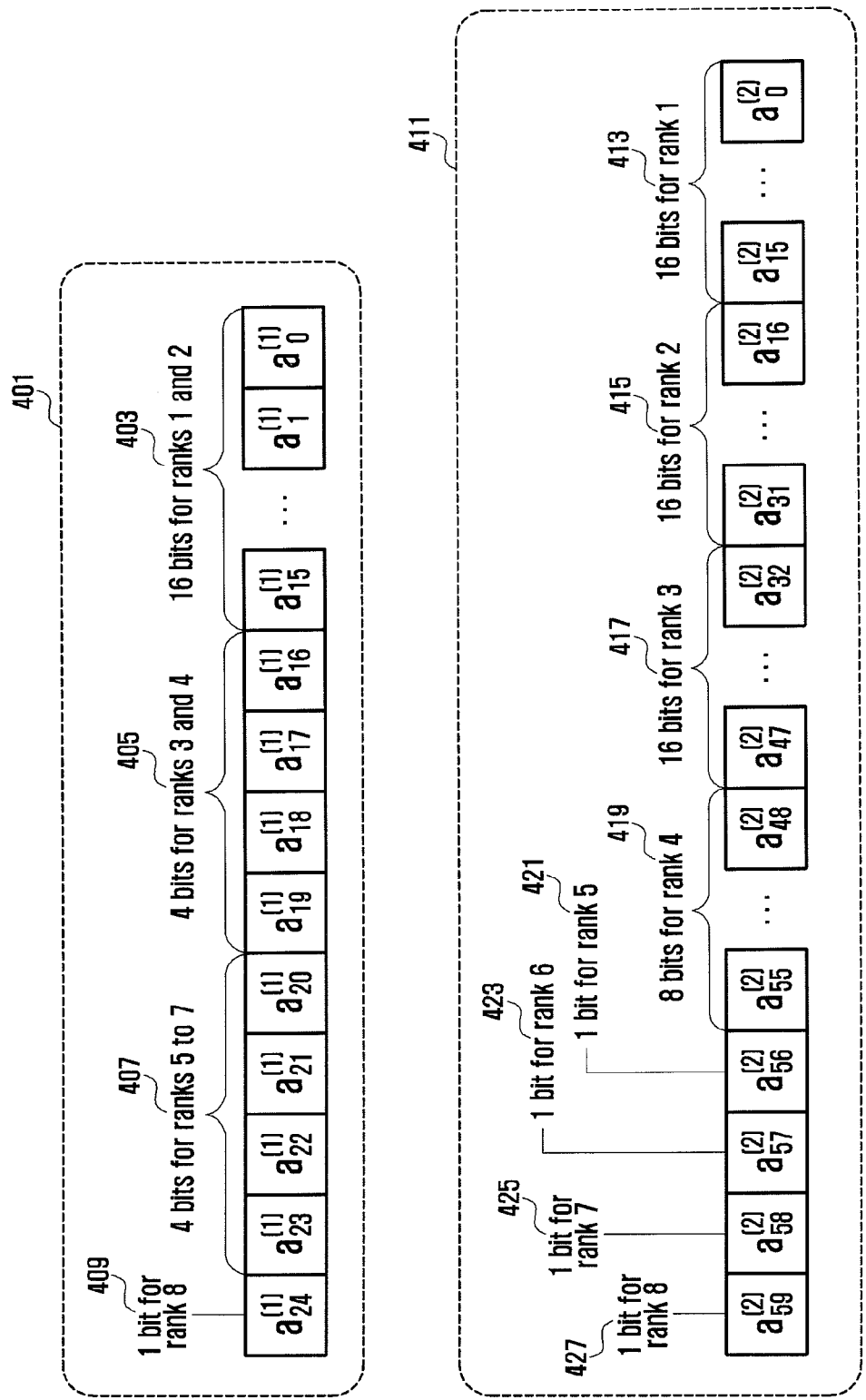
FIG. 6 is a diagram illustrating a CSR bitmap according to the exemplary embodiment 4-1 of the present invention.

FIG. 6 is a diagram illustrating the CSR bitmap according to the exemplary embodiment 4-1 of the present invention.

Referring to FIG. 6, reference number 401 denotes the bitmap $B_1$ for codebook $C_1$, and reference number 411 denotes the bitmap $B_2$ for codebook $C_2$. The bitmap $B_1$ is composed of total 25 bits with the MSB 409 corresponding to the precoding matrix defined for rank-8. Reference number 403 denotes the bits corresponding to the precoding matrices defined to be commonly used for rank-1 and rank-2. Reference number 405 denotes the bits corresponding to the precoding matrices defined to be commonly used for rank-3 and rank-4. Reference number 407 denotes the bits corresponding to the precoding matrices defined to be commonly used for rank-5 to rank-7. The bitmap $B_2$ is composed of total 60 bits including bits 413, 415, 417, 419, 421, 423, 425, and 427 corresponding to the precoding matrices for rank-1, rank-2, rank-3, rank-4, rank-5, rank-6, rank-7, and rank-8, respectively.

Exemplary Embodiment 4-2

Define Single Bitmap in the Form of $\{B_2, B_1\}$

In the exemplary embodiment 4-2, the bitmaps $B_1$ and $B_2$ are defined in the same manner as exemplary embodiment 4-1 and then combined in a certain order to generate an integrated bitmap B. The bitmap B is defined as Equation (2). The size of bitmap B $A_C = A_C^{(1)} + A_C^{(2)}$ is summarized as shown in Table 23 derived from Table 22.

TABLE 23

CSR bitmap size per transmission mode according to exemplary embodiments 4-2 and 4-3

| Transmission mode | Number of bits AC | | |
|---|---|---|---|
| | 2 antenna ports | 4 antenna ports | 8 antenna ports |
| 3 | 2 | 4 | — |
| 4 | 6 | 64 | — |
| 5 | 4 | 16 | — |

TABLE 23-continued

CSR bitmap size per transmission mode according to exemplary embodiments 4-2 and 4-3

| Transmission mode | Number of bits AC | | |
|---|---|---|---|
| | 2 antenna ports | 4 antenna ports | 8 antenna ports |
| 6 | 4 | 16 | — |
| 9 | 6 | 64 | 85 |
| 10 | 4 | 16 | 32 |

In the exemplary embodiment 4-2, individual bits of the bitmap are interpreted as follows.

Transmission Mode 9

2 TX antennas: Refer to Table 5

4 TX antennas: Bit $a_{16(v-1)+i}$ is designated for the precoding matrix corresponding to the codebook index i in Table 3 and rank value v.

8 TX antennas: Bit $a_{25(\chi-1)+f^{(\chi)}(v)+i_\chi}$ is designated for the precoding matrix corresponding to the codebook index $i_\chi$ ($\chi$=1,2) in tables 6 to 13 and the rank value v. Here, $$f^{(1)}(v) = \begin{cases} 0 & \text{for } v = 1, 2 \\ 16 & \text{for } v = 3, 4 \\ 20 & \text{for } v = 5, 6, 7 \\ 24 & \text{for } v = 8 \end{cases}, \text{ and } f^{(2)}(v) = \begin{cases} 0 & \text{for } v = 1 \\ 16 & \text{for } v = 2 \\ 32 & \text{for } v = 3 \\ 48 & \text{for } v = 4 \\ 56 & \text{for } v = 5 \\ 57 & \text{for } v = 6 \\ 58 & \text{for } v = 7 \\ 59 & \text{for } v = 8 \end{cases}.$$

Figure 7:
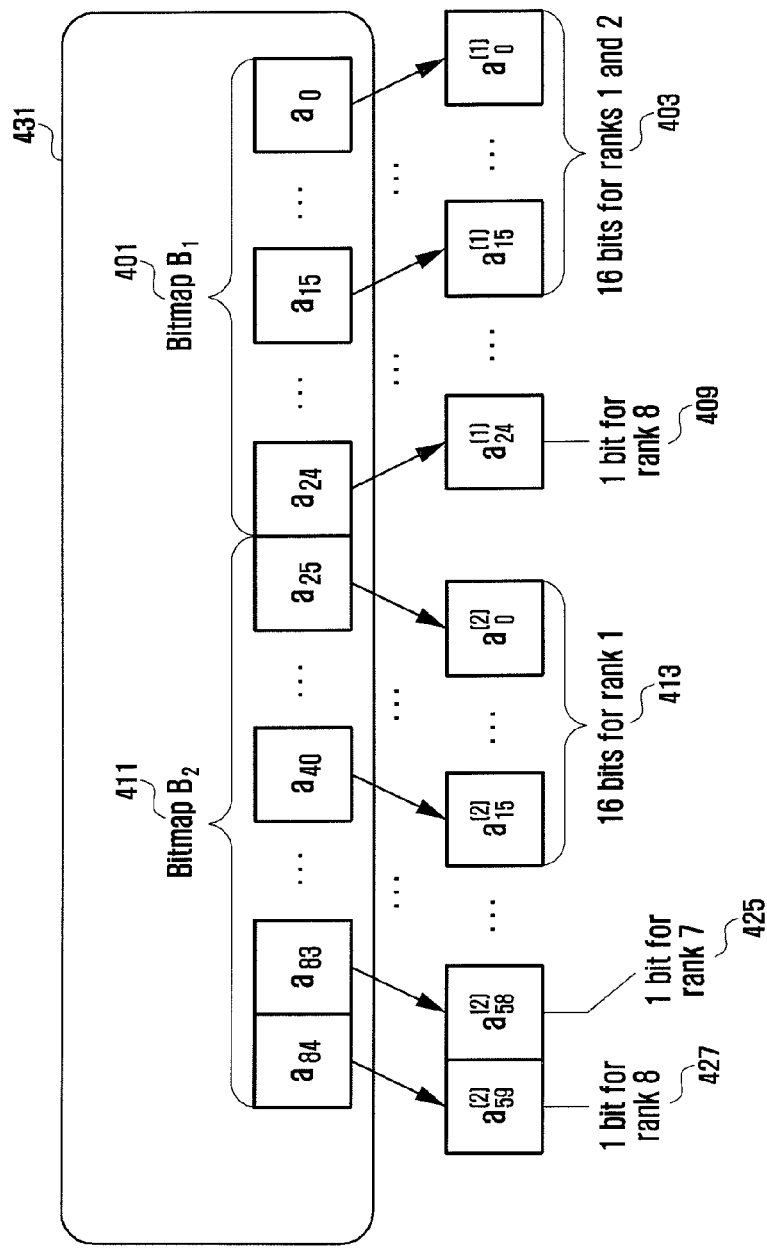
FIG. 7 is a diagram illustrating a CSR bitmap according to the exemplary embodiment 4-2 of the present invention.

FIG. 7 is a diagram illustrating the CSR bitmap according to the exemplary embodiment 4-2 of the present invention.

Referring to FIG. 7, reference number 431 denotes the bitmap B produced by combining the bitmap $B_1$ 401 for the codebook $C_1$ and the bitmap $B_2$ 411 for the codebook $C_2$ in a certain order. As shown in FIG. 7, the bitmaps are arranged in order of $B_2$ 411 and $B_1$ 401.

Exemplary Embodiment 4-3

Define Single Bitmap in the Form of $\{B_1, B_2\}$

The exemplary embodiment 4-3 is identical with the exemplary embodiment 4-2 except that the integrated bitmap B is generated by combining the bitmaps $B_1$ and $B_2$ in $\{B_1, B_2\}$. The bitmap B is defined as Equation (3).

The size of bitmap B $A_C = A_C^{(1)} + A_C^{(2)}$ is determined as shown in Table 23 derived from Table 22. Since the individual bits of the bitmap according to exemplary embodiment 4-3 are interpreted in the same manner as the bitmap according to exemplary embodiment 4-2, detailed description thereon is omitted herein.

Fifth Exemplary Embodiment

In the fifth exemplary embodiment, the bitmaps for the respective codebooks $C_1$ and $C_2$ are defined separately for subset restriction in 8-Tx codebook for LTE Rel-10 with the significant reduction of the size of the CSR bitmap $B_1$ for codebook $C_1$ in such a manner that the ranks using the same $W_1$ share the same bits according to the dual codebook design principle and the removal of unnecessary bits in the CSR bitmap $B_2$ for codebook $C_2$. This means that the fifth exemplary embodiment takes the advantages of both the third and fourth exemplary embodiments. Using this characteristic, the codebook size is reduced as shown in Table 24. The size of the CSR bitmap $B_1$ for codebook $C_1$ is reduced to 25, and the size of the CSR bitmap $B_2$ for codebook $C_2$ is reduced to 56.

TABLE 24 size of codebook according to fifth exemplary embodiment

Required number of bits for codebook subset restriction signaling
Rank

| | 1 | 2 | 3 | 4 | 5 | 6 | 7 | 8 | Sum |
|---|---|---|---|---|---|---|---|---|---|
| $n(C_1)$ | 16 | | 4 | | | 4 | | 1 | 25 |
| $n(C_2)$ | 16 | 16 | 16 | 8 | — | — | — | — | 56 |

Exemplary Embodiment 5-1

Separate Bitmap Signaling

In the exemplary embodiment 5-1, two bitmaps $B_1$ and $B_2$ are introduced with the definition for applying the codebook subset restriction to the respective codebooks $C_1$ and $C_2$. The bitmaps $B_1$ and $B_2$ can be expressed by bit streams as follows:

$$B_1 = \left\{ a^{(1)}_{A_C^{(1)}-1}, \ldots, a^{(1)}_3, a^{(1)}_2, a^{(1)}_1, a^{(1)}_0 \right\}$$

$$B_2 = \left\{ a^{(2)}_{A_C^{(2)}-1}, \ldots, a^{(2)}_3, a^{(2)}_2, a^{(2)}_1, a^{(2)}_0 \right\}$$

where $A_C^{(1)}$ and $A_C^{(2)}$ denote the number of bits of the respective bitmaps $B_1$ and $B_2$. As summarized in Table 24, the codebooks $C_1$ and $C_2$ include 25 and 56 precoding matrices, respectively. Table 25 summarizes the bitmap sizes $A_C^{(1)}$ and $A_C^{(2)}$.

TABLE 25

CSR bitmap size per transmission mode in exemplary embodiment 5-1

| Transmission mode | Number of bits AC 2 antenna ports | 4 antenna ports | Number of bits $A_C^{(1)}$ 8 antenna ports | Number of bits $A_C^{(2)}$ 8 antenna ports |
|---|---|---|---|---|
| 3 | 2 | 4 | — | — |
| 4 | 6 | 64 | — | — |
| 5 | 4 | 16 | — | — |
| 6 | 4 | 16 | — | — |
| 9 | 6 | 64 | 25 | 56 |
| 10 | 4 | 16 | 16 | 16 |

In the exemplary embodiment 5-1, individual bits of the bitmap are interpreted as follows.
Transmission Mode 9
2 TX antennas: Refer to Table 5
4 TX antennas: Bit $a_{16(v-1)+i}$ is designated for the precoding matrix corresponding to the codebook index i in Table 3 and rank v.
8 TX antennas: Bit $a^{(1)}_{f^{(1)}(v)+i_1}$ is designated for the precoding matrix corresponding to the codebook index $i_1$ in tables 6 to 13 and the rank v. Here, $$f^{(1)}(v) = \begin{cases} 0 & \text{for } v = 1, 2 \\ 16 & \text{for } v = 3, 4 \\ 20 & \text{for } v = 5, 6, 7 \\ 24 & \text{for } v = 8 \end{cases}.$$

Bit $a^{(2)}_{f^{(2)}(v)+i_2}$ is designated for the precoding matrix corresponding to the codebook index $i_2$ in tables 6 to 13 and the rank value v. Here, $$f^{(2)}(v) = \begin{cases} 0 & \text{for } v = 1 \\ 16 & \text{for } v = 2 \\ 32 & \text{for } v = 3 \\ 48 & \text{for } v = 4 \end{cases}.$$

In the case of transmission mode 10 designed for supporting only rank-1, there is no difference between the fifth and second exemplary embodiments.

Exemplary Embodiment 5-2

Define Single Bitmap in the Form of $\{B_2, B_1\}$

In the exemplary embodiment 5-2, the bitmaps $B_1$ and $B_2$ are defined in the same manner as exemplary embodiment 5-1 and then combined in a certain order to generate an integrated bitmap B. The bitmap B is defined as Equation (2). The size of bitmap $A_C = A_C^{(1)} + A_C^{(2)}$ is summarized as shown in Table 26 derived from Table 25.

TABLE 26

CSR bitmap size per transmission mode according to exemplary embodiments 5-2 and 5-3

| | Number of bits AC | | |
|---|---|---|---|
| Transmission mode | 2 antenna ports | 4 antenna ports | 8 antenna ports |
| 3 | 2 | 4 | — |
| 4 | 6 | 64 | — |
| 5 | 4 | 16 | — |
| 6 | 4 | 16 | — |
| 9 | 6 | 64 | 81 |
| 10 | 4 | 16 | 32 |

In the exemplary embodiment 5-2, individual bits of the bitmap are interpreted as follows.
Transmission Mode 9
2 TX antennas: Refer to Table 5
4 TX antennas: Bit $a_{16(v-1)+i}$ is designated for the precoding matrix corresponding to the codebook index i in Table 3 and rank value v.
8 TX antennas: Bit $a_{25(\chi-1)+f^{(\chi)}(v)+i_\chi}$ is designated for the precoding matrix corresponding to the codebook index $i_\chi$ ($\chi$=1,2) in tables 6 to 13 and the rank value v. Here, $$f^{(1)}(v) = \begin{cases} 0 & \text{for } v = 1, 2 \\ 16 & \text{for } v = 3, 4 \\ 20 & \text{for } v = 5, 6, 7 \\ 24 & \text{for } v = 8 \end{cases}, \text{ and}$$

-continued $$f^{(2)}(v) = \begin{cases} 0 & \text{for } v = 1 \\ 16 & \text{for } v = 2 \\ 32 & \text{for } v = 3 \\ 48 & \text{for } v = 4 \end{cases}.$$

Exemplary Embodiment 5-3

Define Single Bitmap in the Form of $\{B_1,B_2\}$

The exemplary embodiment 5-3 is identical with the exemplary embodiment 5-2 except that the integrated bitmap B is generated by combining the bitmaps $B_1$ and $B_2$ in order of $\{B_1,B_2\}$. The bitmap B is defined as Equation (3).

The size of bitmap B $A_C = A_C^{(1)} + A_C^{(2)}$ is determined as shown in Table 26 derived from Table 25. Since the individual bits of the bitmap according to exemplary embodiment 5-3 are interpreted in the same manner as the bitmap according to exemplary embodiment 5-2, detailed description thereon is omitted herein.

Sixth Exemplary Embodiment

In the sixth exemplary embodiment, a single bitmap is defined for subset restriction in 8-Tx codebook for LTE Rel-10 such that the subset restriction can be applied to all the definable precoding matrices. The sixth exemplary embodiment is identical with the first exemplary embodiment except that the overlapping elements are removed from the final precoding matrix W generated by the multiplication of $W_1$ and $W_2$. According to the dual codebook structure design principle, element overlapping is allowed in the final precoding matrix W. The sizes of CSR bitmap according to the sixth exemplary embodiment are summarized in Table 27.

TABLE 27

CSR bitmap size per transmission mode according to sixth exemplary embodiment

| Transmission mode | Number of bits AC | | |
|---|---|---|---|
| | 2 antenna ports | 4 antenna ports | 8 antenna ports |
| 3 | 2 | 4 | — |
| 4 | 6 | 64 | — |
| 5 | 4 | 16 | — |
| 6 | 4 | 16 | — |
| 9 | 6 | 64 | 459 |
| 10 | 4 | 16 | 128 |

Exemplary Embodiment 6-1

$i_1$ Preference Mapping—Method 1

In the exemplary embodiment 6-1, the bitmap for the codebook $C_1$ having the precoding matrix $W_1$ takes the lead. In this case, the individual bits of the bitmap are interpreted as follows:

Transmission Mode 9

2 TX antennas: Refer to Table 5

4 TX antennas: Bit $a_{16(v-1)+i}$ is designated for the precoding matrix corresponding to the codebook index i in Table 3 and rank v.

8 TX antennas: Bit $a_{g(v)+h(v,i_2)f(v)+i_1}$ is designated for the precoding matrix corresponding to the codebook index pair $(i_1, i_2)$ in tables 6 to 13 and the rank v. Here, $$g(v) = \begin{cases} 0 & \text{for } v = 1 \\ 128 & \text{for } v = 2 \\ 320 & \text{for } v = 3 \\ 384 & \text{for } v = 4 \\ 416 & \text{for } v = 5 \\ 420 & \text{for } v = 6 \\ 424 & \text{for } v = 7 \\ 428 & \text{for } v = 8 \end{cases},$$

$$f(v) = \begin{cases} 16 & \text{for } v = 1, 2 \\ 4 & \text{for } v = 2, 3, 4, 5, 6 \end{cases},$$

$$h(v, i_2) = \begin{cases} i_2 & \text{for } v = 1, 3, 4, 5, 6, 7, 8 \text{ and} \\ i_2 & \text{for } v = 2 \text{ and } i_2 \leq 3 \\ i_2 - 4 & \text{for } v = 2 \text{ and } i_2 \geq 8 \end{cases},$$

and $i_2$ is restricted to $\{0, \ldots, 7\}$ in Table 6 and to $\{0, \ldots, 3, 8, \ldots, 15\}$ in Table 7.

Transmission Mode 10

2 TX antennas: Bit $a_i$ is designated for the precoding matrix corresponding to the codebook index i in Table 2 and rank value v=1.

4 TX antennas: Bit $a_i$ is designated for the precoding matrix corresponding to the codebook index i in Table 3 and rank value v=1.

8 TX antennas: Bit $a_{16i_2+i_1}$ is designated for the precoding matrix corresponding to the codebook index pair $(i_1, i_2)$ in Table 6 and rank value v=1. Here, $i_2$ is restricted to $\{0, \ldots, 7\}$ in Table 6. In the equations, g(v) indicates the total number of precoding matrices of which rank is less than v, and $f(v)$ indicates the size of codebook $C_1$. For reference, although $f(8)=1$ according to the definition of function $f(v)$, there is no need to define $f(8)=1$ separately because $i_2=0$ or v=8.

Exemplary Embodiment 6-2

$i_2$ Preference Mapping—Method 1

In the exemplary embodiment 6-2, the bitmap for the codebook $C_1$ having the precoding matrix $W_1$ takes the lead. In this case, the individual bits of the bitmap are interprets as follows:

Transmission Mode 9

2 TX antennas: Refer to Table 5

4 TX antennas: Bit $a_{16(v-1)+i}$ is designated for the precoding matrix corresponding to the codebook index i in Table 3 and rank v.

8 TX antennas: Bit $a_{g(v)+i_1 f(v)+h(v,i_2)}$ is designated for the precoding matrix corresponding to the codebook index pair $(i_1, i_2)$ in tables 6 to 13 and the rank v. Here, $$g(v) = \begin{cases} 0 & \text{for } v = 1 \\ 128 & \text{for } v = 2 \\ 320 & \text{for } v = 3 \\ 384 & \text{for } v = 4 \\ 416 & \text{for } v = 5 \\ 420 & \text{for } v = 6 \\ 424 & \text{for } v = 7 \\ 428 & \text{for } v = 8 \end{cases},$$

$$f(v) = \begin{cases} 8 & \text{for } v = 1 \\ 12 & \text{for } v = 2 \\ 16 & \text{for } v = 3 \\ 8 & \text{for } v = 4 \\ 1 & \text{for } v = 5, 6, 7, 8 \end{cases},$$

$$h(v, i_2) = \begin{cases} i_2 & \text{for } v = 1, 3, 4, 5, 6, 7, 8 \text{ and} \\ & \text{for } v = 2 \text{ and } i_2 \leq 3 \\ i_2 - 4 & \text{for } v = 2 \text{ and } i_2 \geq 8 \end{cases},$$

and $i_2$ is restricted to $\{0, \ldots, 7\}$ in Table 6 and to $\{0, \ldots, 3, 8, \ldots, 15\}$ in Table 7.

Transmission Mode 10

2 TX antennas: Bit $a_i$ is designated for the precoding matrix corresponding to the codebook index i in Table 2 and rank value v=1.

4 TX antennas: Bit $a_i$ is designated for the precoding matrix corresponding to the codebook index i in Table 3 and rank value v=1.

8 TX antennas: Bit $a_{8i_1+i_2}$ is designated for the precoding matrix corresponding to the codebook index pair ($i_1$, $i_2$) in Table 6 and rank value v=1. Here, $i_2$ is restricted to $\{0, \ldots, 7\}$ in Table 6. In equations, g(v) indicates the total number of precoding matrices of which rank is less than v, and $f(v)$ indicates the size of codebook $C_2$. For reference, although $f(8)=1$ according to the definition of function $f(v)$, there is no need to define $f(8)=1$ separately because $i_2=0$ for v=8.

Exemplary Embodiment 6-3

$i_1$ Preference Mapping—Method 2

In the exemplary embodiment 6-3, the bitmap for the codebook $C_1$ having the precoding matrix $W_1$ takes the lead. In this case, the individual bits of the bitmap are interpreted as follows:

Transmission Mode 9

2 TX antennas: Refer to Table 5

4 TX antennas: Bit $a_{16(v-1)+i}$ is designated for the precoding matrix corresponding to the codebook index i in Table 3 and rank v.

8 TX antennas: Bit $a_{g(v)+h(v,i_2)f(v)+i_1}$ is designated for the precoding matrix corresponding to the codebook index pair ($i_1$, $i_2$) in tables 6 to 13 and the rank v. Here, $$g(v) = \begin{cases} 0 & \text{for } v = 1 \\ 128 & \text{for } v = 2 \\ 320 & \text{for } v = 3 \\ 384 & \text{for } v = 4 \\ 416 & \text{for } v = 5 \\ 420 & \text{for } v = 6 \\ 424 & \text{for } v = 7 \\ 428 & \text{for } v = 8 \end{cases},$$

$$f(v) = \begin{cases} 16 & \text{for } v = 1, 2 \\ 4 & \text{for } v = 2, 3, 4, 5, 6 \end{cases},$$

and $$h(v, i_2) = \begin{cases} i_2 & \text{for } v = 3, 4, 5, 6, 7, 8 \\ i_2 - 8 & \text{for } v = 1 \\ i_2 - 4 & \text{for } v = 2 \end{cases},$$

and $i_2$ is restricted to $\{8, \ldots, 15\}$ in Table 6 and to $\{4, \ldots, 15\}$ in Table 7.

Transmission Mode 10

2 TX antennas: Bit $a_i$ is designated for the precoding matrix corresponding to the codebook index i in Table 2 and rank value v=1.

4 TX antennas: Bit $a_i$ is designated for the precoding matrix corresponding to the codebook index i in Table 3 and rank value v=1.

8 TX antennas: Bit $a_{16i_2+i_1}$ is designated for the precoding matrix corresponding to the codebook index pair ($i_1$, $i_2$) in Table 6 and rank value v=1. Here, $i_2$ is restricted to $\{8, \ldots, 15\}$ in Table 6. In the equations, g(v) indicates the total number of precoding matrices of which rank is less than v, and $f(v)$ indicates the size of codebook $C_1$. For reference, although $f(8)=1$ according to the definition of function $f(v)$, there is no need to define $f(8)=1$ separately because $i_2=0$ for v=8.

Exemplary Embodiment 6-4

$i_2$ Preference Mapping—Method 2

In the exemplary embodiment 6-4, the bitmap for the codebook $C_2$ having the precoding matrix $W_2$ takes the lead. In this case, the individual bits of the bitmap are interprets as follows:

Transmission Mode 9

2 TX antennas: Refer to Table 5

4 TX antennas: Bit $a_{16(v-1)+i}$ is designated for the precoding matrix corresponding to the codebook index i in Table 3 and rank v.

8 TX antennas: Bit $a_{g(v)+i_1f(v)+h(v,i_2)}$ is designated for the precoding matrix corresponding to the codebook index pair ($i_1$, $i_2$) in tables 6 to 13 and the rank v. Here, $$g(v) = \begin{cases} 0 & \text{for } v = 1 \\ 128 & \text{for } v = 2 \\ 320 & \text{for } v = 3 \\ 384 & \text{for } v = 4 \\ 416 & \text{for } v = 5 \\ 420 & \text{for } v = 6 \\ 424 & \text{for } v = 7 \\ 428 & \text{for } v = 8 \end{cases},$$

-continued $$f(v) = \begin{cases} 8 & \text{for } v = 1 \\ 12 & \text{for } v = 2 \\ 16 & \text{for } v = 3 \\ 8 & \text{for } v = 4 \\ 1 & \text{for } v = 5, 6, 7, 8 \end{cases},$$

and $$h(v, i_2) = \begin{cases} i_2 & \text{for } v = 3, 4, 5, 6, 7, 8 \\ i_2 - 8 & \text{for } v = 1 \\ i_2 - 4 & \text{for } v = 2 \end{cases},$$

and $i_2$ is restricted to $\{8, \ldots, 15\}$ in Table 6 and to $\{4, \ldots, 15\}$ in Table 7.

Transmission Mode 10

2 TX antennas: Bit $a_i$ is designated for the precoding matrix corresponding to the codebook index i in Table 2 and rank value v=1.

4 TX antennas: Bit $a_i$ is designated for the precoding matrix corresponding to the codebook index i in Table 3 and rank value v=1.

8 TX antennas: Bit $a_{8i_1+i_2-8}$ is designated for the precoding matrix corresponding to the codebook index pair $(i_1, i_2)$ in Table 6 and rank value v=1. Here, $i_2$ is restricted to $\{8, \ldots, 15\}$ in Table 6. In the equations, g(v) indicates the total number of precoding matrices of which rank is less than v, and $f(v)$ indicates the size of codebook $C_2$. For reference, although $f(8)=1$ according to the definition of function $f(v)$, there is no need to define $f(8)$ separately because $i_1=0$ for v=8.

Seventh Exemplary Embodiment

In the seventh exemplary embodiment, the bitmaps for the codebooks $C_1$ and $C_2$ are defined separately for subset restriction in 8-Tx codebook for LTE Rel-10 with the significant reduction of the size of the CSR bitmap $B_1$ for codebook $C_1$ in such a manner that the ranks using the same $W_1$ share the same bits according to the dual codebook design principle and the removal of unnecessary bits in the CSR bitmap $B_2$ for codebook $C_2$, in another way. The seventh exemplary embodiment takes the advantages of the third and fourth exemplary embodiments with difference from the fifth exemplary embodiment. The sizes of the codebook according to the seventh exemplary embodiment are shown in Table 28. The size of CSR bitmap $B_1$ for codebook $C_1$ is reduced to 25, and the size of the CSR bitmap $B_2$ for codebook $C_2$ is reduced to 59.

TABLE 28 size of codebook according to seventh exemplary embodiment

Required number of bits for codebook subset restriction signaling

| | Rank | | | | | | | | |
|---|---|---|---|---|---|---|---|---|---|
| | 1 | 2 | 3 | 4 | 5 | 6 | 7 | 8 | Sum |
| n($C_1$) | 16 | | 4 | | | 4 | | 1 | 25 |
| n($C_2$) | 16 | 16 | 16 | 8 | 1 | 1 | 1 | — | 59 |

Exemplary Embodiment 7-1

Separate Bitmap Signaling

In the exemplary embodiment 7-1, two bitmaps $B_1$ and $B_2$ are introduced with the definition for applying the codebook subset restriction to the respective codebooks $C_1$ and $C_2$. The bitmaps $B_1$ and $B_2$ can be expressed by bit streams as follows:

$$B_1 = \{a^{(1)}_{A_C^{(1)}-1}, \ldots, a^{(1)}_3, a^{(1)}_2, a^{(1)}_1, a^{(1)}_0\}$$

$$B_2 = \{a^{(2)}_{A_C^{(2)}-1}, \ldots, a^{(2)}_3, a^{(2)}_2, a^{(2)}_1, a^{(2)}_0\}$$

where $A_C^{(1)}$ and $A_C^{(2)}$ denote numbers of bits of the respective bitmaps $B_1$ and $B_2$. As summarized in Table 28, the codebooks $C_1$ and $C_2$ include 25 and 59 precoding matrices, respectively. Table 29 summarizes the bitmap sizes $A_C^{(1)}$ and $A_C^{(2)}$.

TABLE 29

CSR bitmap size per transmission mode in exemplary embodiment 7-1

| | Number of bits AC | | Number of bits $A_C^{(1)}$ | Number of bits $A_C^{(2)}$ |
|---|---|---|---|---|
| Transmission mode | 2 antenna ports | 4 antenna ports | 8 antenna ports | |
| 3 | 2 | 4 | — | — |
| 4 | 6 | 64 | — | — |
| 5 | 4 | 16 | — | — |
| 6 | 4 | 16 | — | — |
| 9 | 6 | 64 | 25 | 59 |
| 10 | 4 | 16 | 16 | 16 |

In the exemplary embodiment 7-1, individual bits of the bitmap are interpreted as follows.

Transmission Mode 9

2 TX antennas: Refer to Table 5

4 TX antennas: Bit $a_{16(v-1)+i}$ is designated for the precoding matrix corresponding to the codebook index i in Table 3 and rank v.

8 TX antennas: Bit $a_{f^{(1)}(v)+i_1}^{(1)}$ is designated for the precoding matrix corresponding to the codebook index $i_1$ in tables 6 to 13 and the rank v. Here, $$f^{(1)}(v) = \begin{cases} 0 & \text{for } v = 1, 2 \\ 16 & \text{for } v = 3, 4 \\ 20 & \text{for } v = 5, 6, 7 \\ 24 & \text{for } v = 8 \end{cases}.$$

Bit $a_{f^{(2)}(v)+i_2}^{(2)}$ is designated for the precoding matrix corresponding to the codebook index $i_2$ in tables 6 to 13 and the rank value v. Here, $$f^{(2)}(v) = \begin{cases} 0 & \text{for } v = 1 \\ 16 & \text{for } v = 2 \\ 32 & \text{for } v = 3 \\ 48 & \text{for } v = 4 \\ 56 & \text{for } v = 5 \\ 57 & \text{for } v = 6 \\ 58 & \text{for } v = 7 \end{cases}.$$

In the case of transmission mode 10 designed for supporting only rank-1, there is no difference between the seventh and second exemplary embodiments.

Exemplary Embodiment 7-2

Define Signal Bitmap in the Form of {B₂,B₁}

In the exemplary embodiment 7-2, the bitmaps $B_1$ and $B_2$ are defined in the same manner as exemplary embodiment 7-1 and then combined in a certain order to generate an integrated bitmap B. The bitmap B is defined as Equation (2). The size of bitmap $A_C = A_C^{(1)} + A_C^{(2)}$ is summarized as shown in Table 30 derived from Table 29.

TABLE 30

CSR bitmap size per transmission mode according to exemplary embodiments 7-2 and 7-3

| Transmission mode | Number of bits AC | | |
|---|---|---|---|
| | 2 antenna ports | 4 antenna ports | 8 antenna ports |
| 3 | 2 | 4 | — |
| 4 | 6 | 64 | — |
| 5 | 4 | 16 | — |
| 6 | 4 | 16 | — |
| 9 | 6 | 64 | 84 |
| 10 | 4 | 16 | 32 |

In the exemplary embodiment 7-2, individual bits of the bitmap are interpreted as follows.

Transmission Mode 9

2 TX antennas: Refer to Table 5

4 TX antennas: Bit $a_{16(v-1)+i}$ is designated for the precoding matrix corresponding to the codebook index i in Table 3 and rank value v.

8 TX antennas: Bit $a_{25(\chi-1)+f^{(\chi)}(v)+i_\chi}$ is designated for the precoding matrix corresponding to the codebook index $i_\chi$ ($\chi=1,2$) in tables 6 to 13 and the rank value v. Here, $$f^{(1)}(v) = \begin{cases} 0 & \text{for } v = 1, 2 \\ 16 & \text{for } v = 3, 4 \\ 20 & \text{for } v = 5, 6, 7 \\ 24 & \text{for } v = 8 \end{cases}, \text{ and}$$

$$f^{(2)}(v) = \begin{cases} 0 & \text{for } v = 1 \\ 16 & \text{for } v = 2 \\ 32 & \text{for } v = 3 \\ 48 & \text{for } v = 4 \\ 56 & \text{for } v = 5 \\ 57 & \text{for } v = 6 \\ 58 & \text{for } v = 7 \end{cases}$$

Exemplary Embodiment 7-3

Define Single Bitmap in the Form of {B₁,B₂}

The exemplary embodiment 7-3 is identical with the exemplary embodiment 7-2 except that the integrated B is generated by combining the bitmaps $B_1$ and $B_2$ in order of $\{B_1, B_2\}$. The bitmap B is defined as Equation (3).

The size of bitmap B $A_C = A_C^{(1)} + A_C^{(2)}$ is determined as shown in Table 30 derived from Table 29. Since the individual bits of the bitmap according to exemplary embodiment 7-3 are interpreted in the same manner as the bitmap according to exemplary embodiment 7-2, detailed description thereon is omitted herein.

As described above, exemplary embodiments of the present invention are capable of providing a CSR signaling method supporting the 8-Tx dual codebook structure in the LTE system with 8 transmit antennas. Exemplary embodiments of the present invention also reduce the size of CSR bitmap efficiently in consideration of the CSR signaling overhead.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a non-transitory computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments, or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to the exemplary embodiments of the invention, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more Central Processing Units (CPUs) in a device or a secure multimedia card.

While the invention has been shown and described with reference to certain exemplary embodiments thereof, it will be understood by those skilled in the art that various other changes in form and details may be made therein without departing from the spirit and scope of the invention as defined by the appended claims and their equivalents.

What is claimed is:

1. A method in a wireless communication system, the method comprising:

transmitting a codebook subset restriction (CSR) bitmap including bits corresponding to restricted precoding matrix indicators (PMIs) that are not allowed to be reported by a terminal; and receiving a PMI which is not included in the restricted PMIs from the terminal, wherein the CSR bitmap comprises a $a_{f^{(1)}(v)+i_1}$-th bit corresponding to a first PMI $i_1$ and a layer v and a $a_{53+f^{(2)}(v)+i_2}$-th bit corresponding to a second PMI $i_2$ and a layer v, wherein the $f^{(1)}(v)$ and the $f^{(2)}(v)$ are defined as the following equations, respectively:

$$f^{(1)}(v) = \begin{cases} 0 & \text{for } v = 1 \\ 16 & \text{for } v = 2 \\ 32 & \text{for } v = 3 \\ 36 & \text{for } v = 4 \\ 40 & \text{for } v = 5 \\ 44 & \text{for } v = 6 \\ 48 & \text{for } v = 7 \\ 52 & \text{for } v = 8 \end{cases} \text{ and}$$

$$f^{(2)}(v) = \begin{cases} 0 & \text{for } v = 1 \\ 16 & \text{for } v = 2 \\ 32 & \text{for } v = 3 \\ 48 & \text{for } v = 4 \end{cases}$$

and wherein the $f^{(2)}(V)$ does not include layers 5, 6, 7, and 8.

2. The method of claim 1, wherein the CSR bitmap is transmitted via a higher layer signaling.

3. The method of claim 1, wherein a number of bits corresponding to the first PMI $i_1$ is 53 and a number of bits corresponding to the second PMI $i_2$ is 56.

4. The method of claim 1, further comprising:
transmitting downlink data based on the PMI.

5. A method in a wireless communication system, the method comprising:

receiving a codebook subset restriction (CSR) bitmap including bits corresponding to restricted precoding matrix indicators (PMIs) that are not allowed to be reported by a terminal; and transmitting a PMI which is not included in the restricted PMIs from the terminal, wherein the CSR bitmap comprises a $a_{f^{(1)}(v)+i_1}$-th bit corresponding to a first PMI $i_1$ and a layer v and, a $a_{53+f^{(2)}(v)+i_2}$-th bit corresponding to a second PMI $i_2$ and a layer v, wherein the $f^{(1)}(v)$ and the $f^{(2)}(v)$ are defined as the following equations, respectively:

$$f^{(1)}(v) = \begin{cases} 0 & \text{for } v = 1 \\ 16 & \text{for } v = 2 \\ 32 & \text{for } v = 3 \\ 36 & \text{for } v = 4 \\ 40 & \text{for } v = 5 \\ 44 & \text{for } v = 6 \\ 48 & \text{for } v = 7 \\ 52 & \text{for } v = 8 \end{cases} \text{ and}$$

$$f^{(2)}(v) = \begin{cases} 0 & \text{for } v = 1 \\ 16 & \text{for } v = 2 \\ 32 & \text{for } v = 3 \\ 48 & \text{for } v = 4 \end{cases}$$

and wherein the $f^{(2)}(v)$ does not include layers 5, 6, 7, and 8.

6. The method of claim 5, wherein the CSR bitmap is received via a higher layer signaling.

7. The method of claim 5, wherein a number of bits corresponding to the first PMI $i_1$ is 53 and a number of bits corresponding to the second PMI $i_2$ is 56.

8. The method of claim 5, further comprising:
receiving downlink data based on the PMI.

9. A base station in a wireless communication system, the base station comprising:

a transceiver configured to transmit and receive signals to and from a terminal; and a controller configured to:
control the transceiver to transmit a codebook subset restriction (CSR) bitmap including bits corresponding to restricted precoding matrix indicators (PMIs) that are not allowed to be reported by the terminal, and
receive a PMI which is not included in the restricted PMIs from the terminal, wherein the CSR bitmap comprises a $a_{f^{(1)}(v)+i_1}$-th bit corresponding to a first PMI $i_1$ and a layer v and, a $a_{53+f^{(2)}(v)+i_2}$-th bit corresponding to a second PMI $i_2$ and a layer v, wherein the $f^{(1)}(v)$ and the $f^{(2)}(v)$ are defined as the following equations, respectively:

$$f^{(1)}(v) = \begin{cases} 0 & \text{for } v = 1 \\ 16 & \text{for } v = 2 \\ 32 & \text{for } v = 3 \\ 36 & \text{for } v = 4 \\ 40 & \text{for } v = 5 \\ 44 & \text{for } v = 6 \\ 48 & \text{for } v = 7 \\ 52 & \text{for } v = 8 \end{cases} \text{ and}$$

$$f^{(2)}(v) = \begin{cases} 0 & \text{for } v = 1 \\ 16 & \text{for } v = 2 \\ 32 & \text{for } v = 3 \\ 48 & \text{for } v = 4 \end{cases}$$

and wherein the $f^{(2)}(v)$ does not include layers 5, 6, 7, and 8.

10. The base station of claim 9, wherein the CSR bitmap is transmitted via a higher layer signaling.

11. The base station of claim 9, wherein a number of bits corresponding to the first PMI $i_1$ is 53 and a number of bits corresponding to the second PMI $i_2$ is 56.

12. The base station of claim 9, wherein the controller is further configured to control the transceiver to transmit downlink data based on the PMI.

13. A terminal in a wireless communication system, the terminal comprising:
- a transceiver configured to transmit and receive signals to and from a base station; and
- a controller configured to:
  - control the transceiver to receive a codebook subset restriction (CSR) bitmap including bits corresponding to restricted precoding matrix indicators (PMIs) that are not allowed to be reported by the terminal, and transmit a PMI which is not included in the restricted PMIs from the terminal,
- wherein the CSR bitmap comprises a $a_{f^{(1)}(v)+i_1}$-th bit corresponding to a first PMI $i_1$ and a layer v and, a $a_{53+f^{(2)}(v)+i_2}$-th bit corresponding to a second PMI $i_2$ and a layer v,
- wherein the $f^{(1)}(v)$ and the $f^{(2)}(v)$ are defined as the following equations, respectively:

$$f^{(1)}(v) = \begin{cases} 0 & \text{for } v=1 \\ 16 & \text{for } v=2 \\ 32 & \text{for } v=3 \\ 36 & \text{for } v=4 \\ 40 & \text{for } v=5 \\ 44 & \text{for } v=6 \\ 48 & \text{for } v=7 \\ 52 & \text{for } v=8 \end{cases} \text{ and}$$

$$f^{(2)}(v) = \begin{cases} 0 & \text{for } v=1 \\ 16 & \text{for } v=2 \\ 32 & \text{for } v=3 \\ 48 & \text{for } v=4 \end{cases}.$$

and wherein the $f^{(2)}(v)$ does not include layers 5, 6, 7, and 8.

14. The terminal of claim 13, wherein the CSR bitmap is received via a higher layer signaling.

15. The terminal of claim 13, wherein a number of bits corresponding to the first PMI $i_1$ is 53 and a number of bits corresponding to the second PMI $i_2$ is 56.

16. The terminal of claim 13, wherein the controller is further configured to control the transceiver to receive downlink data based on the PMI.

* * * * *